(12) United States Patent
Jutamulia

(10) Patent No.: US 12,711,572 B2
(45) Date of Patent: Aug. 18, 2026

(54) IMAGE DEMOSAICING METHOD

(71) Applicant: OmniVision Technologies, Inc., Santa Clara, CA (US)

(72) Inventor: Suganda Jutamulia, Berkeley, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 19/244,356

(22) Filed: Jun. 20, 2025

(65) Prior Publication Data

US 2026/0044927 A1 Feb. 12, 2026

Related U.S. Application Data

(63) Continuation-in-part of application No. 18/798,983, filed on Aug. 9, 2024, now abandoned.

(51) Int. Cl.

| | |
|---|---|
| ***G06T 3/4015*** | (2024.01) |
| ***H04N 23/84*** | (2023.01) |
| ***H04N 25/13*** | (2023.01) |

(52) U.S. Cl.

CPC ......... *G06T 3/4015* (2013.01); *H04N 23/843* (2023.01); *H04N 25/134* (2023.01)

(58) Field of Classification Search

None

See application file for complete search history.

(56) References Cited

U.S. PATENT DOCUMENTS

| | | | | |
|---|---|---|---|---|
| 11,902,712 | B2 | 2/2024 | Lee et al. | |
| 2003/0197796 | A1* | 10/2003 | Taubman | H04N 25/134 348/E9.01 |
| 2016/0093019 | A1* | 3/2016 | Ayers | G06T 3/4053 382/299 |
| 2017/0223324 | A1 | 8/2017 | Sato et al. | |
| 2021/0112223 | A1 | 4/2021 | Tsukada | |
| 2023/0388667 | A1 | 11/2023 | Sharabi et al. | |

(Continued)

OTHER PUBLICATIONS

EMVA 1288 Imaging Performance [online]. Teledyne, 2002 [retrieved on Aug. 7, 2024], Retrieved from the Internet: <https://softwareservices.flir.com/BFS-U3-51S5/latest/EMVA/EMVA.html>, 3 pages.

(Continued)

*Primary Examiner* — Leon Viet Q Nguyen

(74) *Attorney, Agent, or Firm* — Cozen O'Connor

(57) ABSTRACT

An image demosaicing method includes determining, for a red pixel of a Bayer unit, a red image-pixel value, a green image-pixel value, and a blue image-pixel value such that each of a first, a second, and a third weighted sum of the red, the green, and the blue image-pixel values equals a respective sensor-pixel value. The first weighted sum equals a red sensor-pixel value output by the red pixel. The second weighted sum equals an average of a green sensor-pixel values output by green pixels of the Bayer unit. The third weighted sum equals a blue sensor-pixel value output by a blue pixel of the Bayer unit. The method also includes outputting a demosaiced image having, at a location in the demosaiced image corresponding to a location of the red pixel, an RGB triplet that includes the red image-pixel value, the green image-pixel value, and the blue image-pixel value.

18 Claims, 8 Drawing Sheets

(56) References Cited

U.S. PATENT DOCUMENTS

| | | | | |
|---|---|---|---|---|
| 2024/0080577 | A1 | 3/2024 | Lee et al. | |
| 2024/0196105 | A1* | 6/2024 | Taylor | G06T 7/90 |
| 2024/0212832 | A1* | 6/2024 | Westwick | G16H 30/40 |
| 2024/0305901 | A1* | 9/2024 | Swami | H04N 23/843 |

OTHER PUBLICATIONS

E-con SystemsTM to launch 4MP RGB IR camera module based on OV4682 [online]. E-con Systems, 2022 [retrieved on Aug. 7, 2024]. Retrieved from the Internet: <https://www.e-consystems.com/blog/camera/products/e-con-systems-to-launch-4mp-ir-camera-module-based-on-ov4682/>, 6 pages.

B. K. Gunturk et al., "Demosaicking: Color Filter Array Interpolation," IEEE Signal Processing Magazine, vol. 22, No. 1, Jan. 2005, pp. 44-54, IEEE, New York, USA, doi:10.1109/MSP.2005.1407714, 11 pages.

J. Lu, "Analysis and Comparison of Three Classical Color Image Interpolation Algorithms," Journal of Physics: Conference Series, 1802, 032124, 2021, Bristol, UK, DOI: 10.1088/174 2-6596/1802/3/032124, 9 pages.

X. Zou et al., "Pixel-level Bayer-type colour router based on metasurfaces," Nature Communications, vol. 13, 3288, 2022, New York, USA, https://doi.org/10.1038/s41467-022-31019-7, 7 pages.

* cited by examiner

300

302

| | | | | | | | |
|---|---|---|---|---|---|---|---|
| R 304 | G 306 | R | G | R | G | R | G |
| G 310 | B 308 | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |

Figure 9:
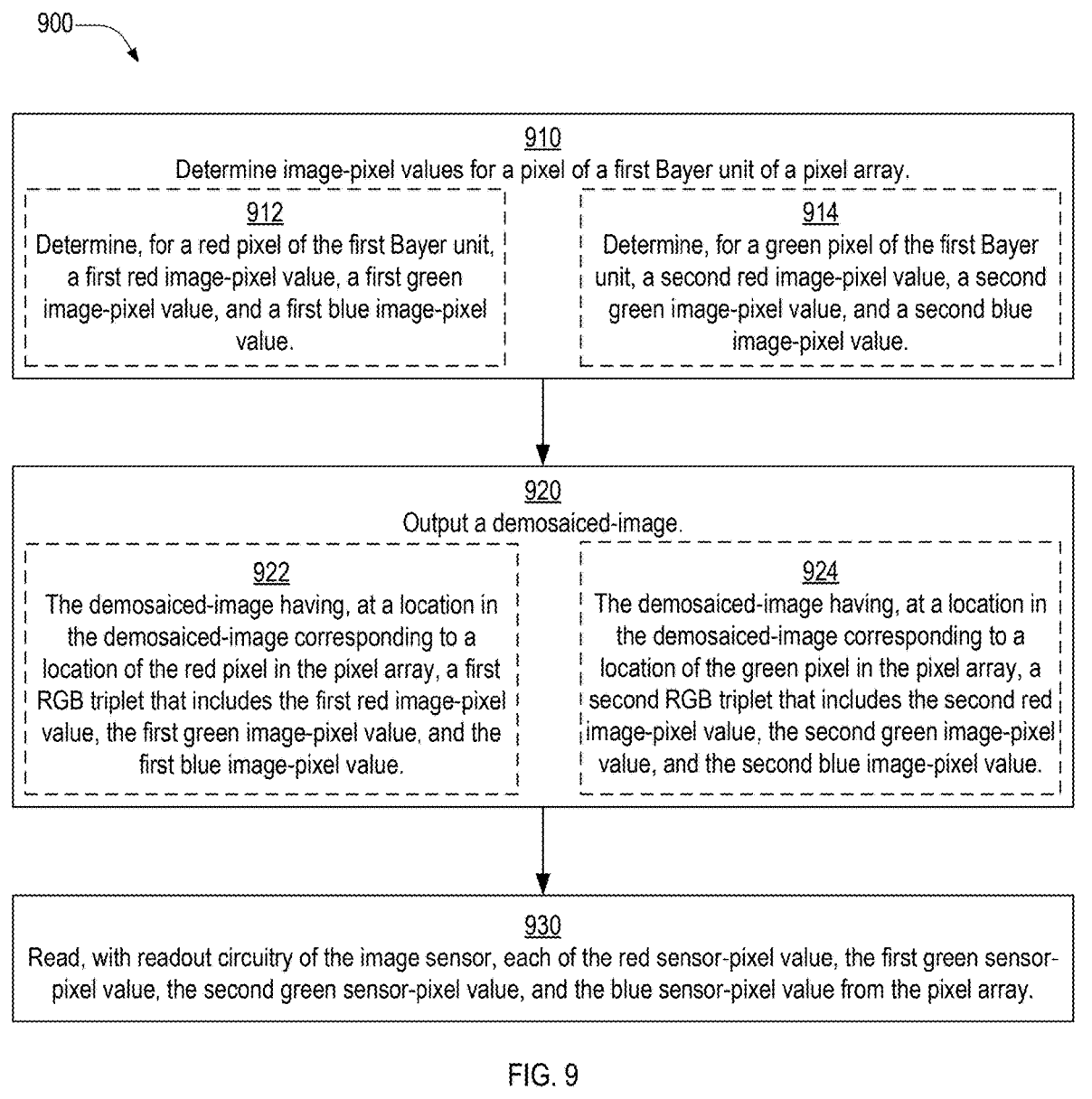

900

910
Determine image-pixel values for a pixel of a first Bayer unit of a pixel array.

912
Determine, for a red pixel of the first Bayer unit, a first red image-pixel value, a first green image-pixel value, and a first blue image-pixel value.

914
Determine, for a green pixel of the first Bayer unit, a second red image-pixel value, a second green image-pixel value, and a second blue image-pixel value.

920
Output a demosaiced-image.

922
The demosaiced-image having, at a location in the demosaiced-image corresponding to a location of the red pixel in the pixel array, a first RGB triplet that includes the first red image-pixel value, the first green image-pixel value, and the first blue image-pixel value.

924
The demosaiced-image having, at a location in the demosaiced-image corresponding to a location of the green pixel in the pixel array, a second RGB triplet that includes the second red image-pixel value, the second green image-pixel value, and the second blue image-pixel value.

930
Read, with readout circuitry of the image sensor, each of the red sensor-pixel value, the first green sensor-pixel value, the second green sensor-pixel value, and the blue sensor-pixel value from the pixel array.

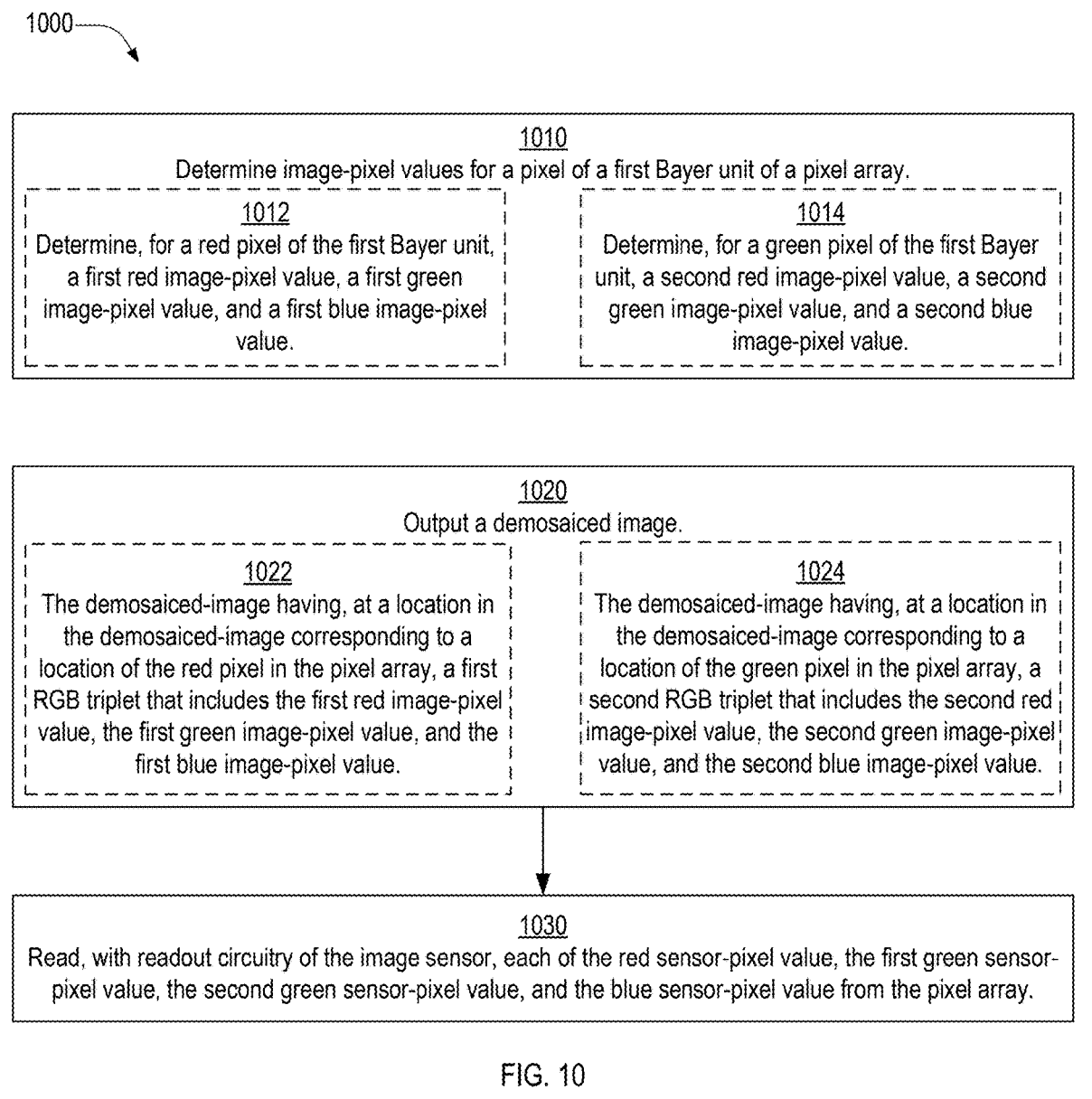

1010
Determine image-pixel values for a pixel of a first Bayer unit of a pixel array.

1012
Determine, for a red pixel of the first Bayer unit, a first red image-pixel value, a first green image-pixel value, and a first blue image-pixel value.

1014
Determine, for a green pixel of the first Bayer unit, a second red image-pixel value, a second green image-pixel value, and a second blue image-pixel value.

1020
Output a demosaiced image.

1022
The demosaiced-image having, at a location in the demosaiced-image corresponding to a location of the red pixel in the pixel array, a first RGB triplet that includes the first red image-pixel value, the first green image-pixel value, and the first blue image-pixel value.

1024
The demosaiced-image having, at a location in the demosaiced-image corresponding to a location of the green pixel in the pixel array, a second RGB triplet that includes the second red image-pixel value, the second green image-pixel value, and the second blue image-pixel value.

1030
Read, with readout circuitry of the image sensor, each of the red sensor-pixel value, the first green sensor-pixel value, the second green sensor-pixel value, and the blue sensor-pixel value from the pixel array.

FIG. 10

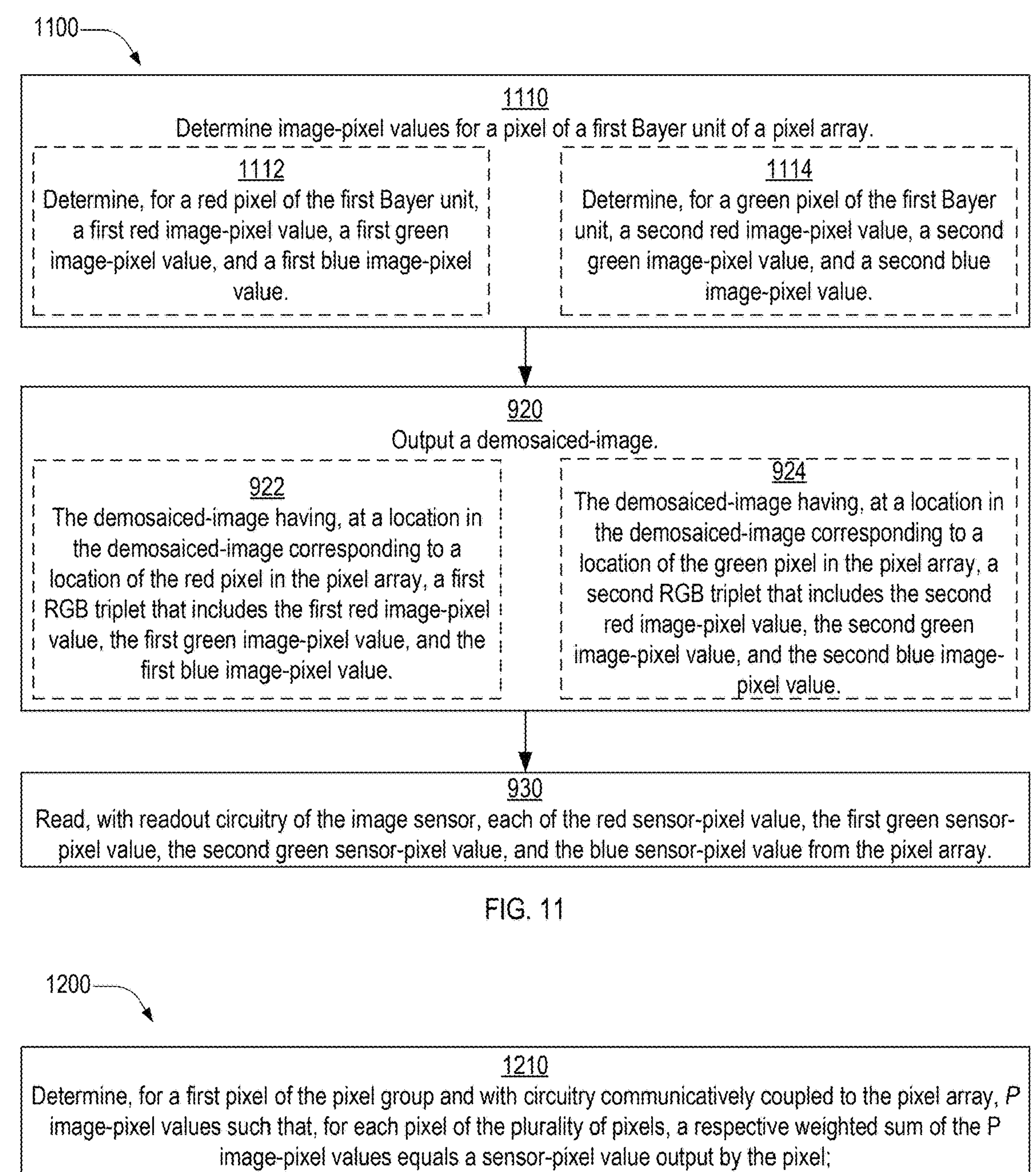

1210
Determine, for a first pixel of the pixel group and with circuitry communicatively coupled to the pixel array, *P* image-pixel values such that, for each pixel of the plurality of pixels, a respective weighted sum of the P image-pixel values equals a sensor-pixel value output by the pixel;

1220
Output, by the circuitry, a demosaiced-image having, at a location in the demosaiced-image corresponding to a location of the first pixel in the pixel array, an image-pixel-value array that includes each of the *P* image-pixel values.

930
Read, with readout circuitry of the image sensor, each of the red sensor-pixel value, the first green sensor-pixel value, the second green sensor-pixel value, and the blue sensor-pixel value from the pixel array.

FIG. 12

IMAGE DEMOSAICING METHOD

CROSS-REFERENCE TO RELATED APPLICATIONS

This application is a continuation-in-part of application Ser. No. 18/798,983, filed 9 Aug. 2024, the entirety of which is incorporated by reference.

FIELD OF THE INVENTION

This disclosure relates to interpolation, and particularly interpolation based on crosstalk.

BACKGROUND

Applications of color image sensors are ubiquitous. A color image sensor, including CMOS and CCD image sensor, comprises a pixel array having a plurality of color pixels. In many cases, color pixels include R (red) color pixels, G (green) color pixels, and B (blue) color pixels. It is commonly assumed that R color pixels detect only R color signal, G color pixels detect only G color signal, and B color pixels detect only B color signal. B color signal may be light integrated in a B band, for example, from 400 to 500 nm wavelength. G color signal may be light integrated in a G band, for example, from 500 to 600 nm wavelength. R color signal may be light integrated in an R band, for example, from 600 to 700 nm wavelength.

To detect a single color signal, the color pixel is covered by a color filter. An R color filter covers an R color pixel. The R color filter blocks all light except light in the R band, for example, from 600 to 700 nm wavelength. A G color filter covers a G color pixel. The G color filter blocks all light except light in the G band, for example, from 500 to 600 nm wavelength. A B color filter covers a B color pixel. The B color filter blocks all light except light in the B band, for example, from 400 to 500 nm wavelength.

A Bayer pattern unit comprises 2×2 color pixels, which are an R pixel, a B pixel, and two G pixels in diagonal direction. For simplicity, R color pixel may be represented as R pixel, R color filter may be represented as R filter, R color signal may be represented as R signal. G color pixel may be represented as G pixel, G color filter may be represented as G filter, G color signal may be represented as G signal. B color pixel may be represented as B pixel, B color filter may be represented as B filter, B color signal may be represented as B signal. A Bayer pattern unit is simply represented as a Bayer unit. An R pixel in a Bayer unit presumably detects only R signal, and no G signal and B signal. A G pixel in a Bayer unit presumably detects only G signal, and no B signal and R signal. A B pixel in a Bayer unit detects presumably only B signal, and no R signal and G signal.

When an R image is extracted, the R image has missing signals, because there is presumably no R signal at the positions of G pixels and B pixels. The missing color signal can be retrieved using interpolation. For example, the missing signal can be approximated by an average of the neighboring signals of the same color. For example, the missing G signal at R pixel or B pixel is interpolated by taking the average of G signals at the top G pixel, the bottom G pixel, the left G pixel, and the right G pixel.

However, in reality, an R filter may also pass light in G and B bands, a G filter may also pass light in B and R bands, and a B filter may also pass light in G and R bands, causing color crosstalk in a pixel. Accordingly, in reality, methods based on the crosstalk, which can estimate the amounts of light of R, G, and B bands in a color pixel are in demand. Related methods for interpolation are also demanded.

SUMMARY OF THE EMBODIMENTS

In a first aspect, a method for demosaicing an image captured by an image sensor having a pixel array that includes a first Bayer unit is disclosed. The method includes determining, for a red pixel of the first Bayer unit and with circuitry communicatively coupled to the pixel array, a first red image-pixel value, a first green image-pixel value, and a first blue image-pixel value such that each of a first, a second, and a third weighted sum of the first red, the first green, and the first blue image-pixel values is equal to a respective sensor-pixel value output by a pixel of the first Bayer unit. The first weighted sum equals a red sensor-pixel value output by the red pixel. The second weighted sum equals an average of a first green sensor-pixel value output by a first green pixel of the first Bayer unit and a second green sensor-pixel value output by a second green pixel of the first Bayer unit. The third weighted sum equals a blue sensor-pixel value output by a blue pixel of the first Bayer unit. The method also includes outputting, by the circuitry, a demosaiced image having, at a location in the demosaiced image corresponding to a location of the red pixel in the pixel array, a first RGB triplet that includes the first red image-pixel value, the first green image-pixel value, and the first blue image-pixel value.

In a second aspect, a method for demosaicing an image captured by an image sensor having a pixel array that includes a first Bayer unit is disclosed. The method includes determining, for a red pixel of the first Bayer unit and with circuitry communicatively coupled to the pixel array, a first red image-pixel value, a first green image-pixel value, a first blue image-pixel value, and a first infrared (IR) image-pixel value such that each of a first, a second, a third, and a fourth weighted sum of the first red, the first green, the first blue, and first IR image-pixel values is equal to a respective sensor-pixel value output by a pixel of the first Bayer unit. The first weighted sum equals a red sensor-pixel value output by the red pixel. The second weighted sum equals a green sensor-pixel value output by a green pixel of the first Bayer unit. The third weighted sum equals a blue sensor-pixel value output by a blue pixel of the first Bayer unit. The fourth weighted sum values equals an IR sensor-pixel value output by an IR pixel of the first Bayer unit. The method also includes outputting, by the circuitry, a demosaiced image having, at a location in the demosaiced image corresponding to a location of the red pixel in the pixel array, a first RGB quadruplet that includes the first red image-pixel value, the first green image-pixel value, first blue image-pixel value, and the first IR image-pixel value.

In a third aspect, a method for demosaicing an image captured by an image sensor having a pixel array that includes a pixel group that includes a plurality of pixels, P in number is disclosed. The method includes determining, for a first pixel of the pixel group and with circuitry communicatively coupled to the pixel array, P image-pixel values such that, for each pixel of the plurality of pixels, a respective weighted sum of the P image-pixel values equals a sensor-pixel value output by the pixel. The method also includes outputting, by the circuitry, a demosaiced image having, at a location in the demosaiced image corresponding to a location of the first pixel in the pixel array, an image-pixel-value array that includes each of the P image-pixel values.

BRIEF DESCRIPTION OF THE FIGURES

Non-limiting and non-exhaustive embodiments of the present invention are described with reference to the following figures, wherein like reference numerals refer to like parts throughout the various views unless otherwise specified.

FIGS. 9-12 are respective flowcharts illustrating embodiments of methods for demosaicing an image captured by an image sensor, such as the image sensor of FIG. 8.

Figure 1A:
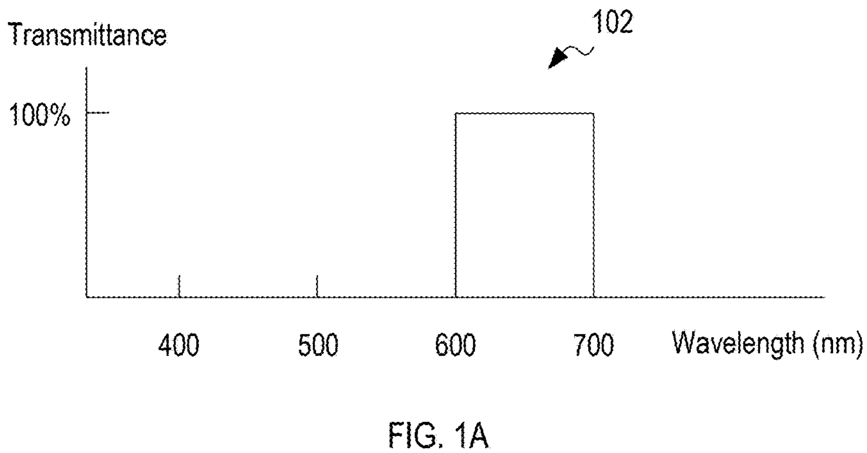
FIG. 1A shows a presumed spectral transmittance of R filter.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION OF THE EMBODIMENTS

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1B:
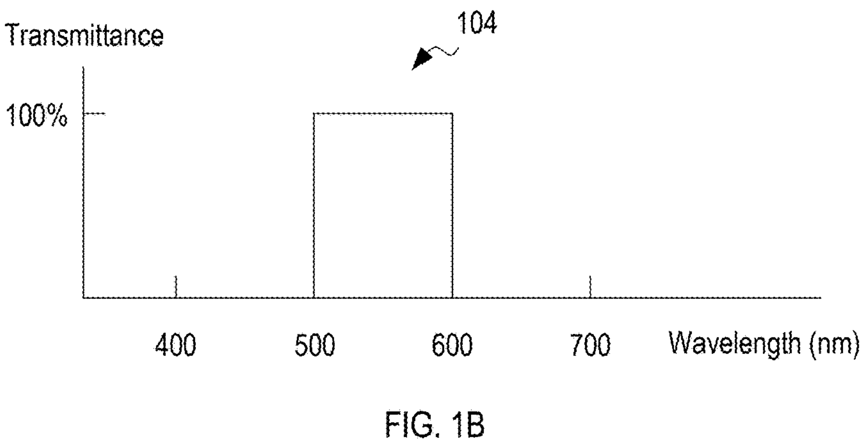
FIG. 1B shows a presumed spectral transmittance of G filter.
Figure 1C:
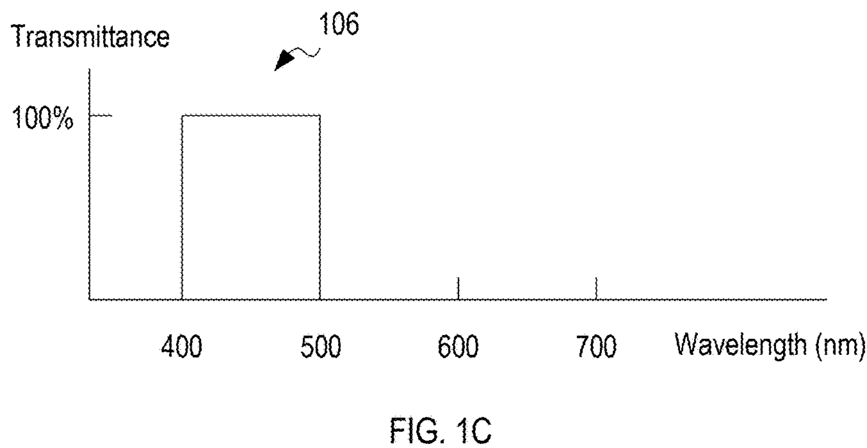
FIG. 1C shows a presumed spectral transmittance of B filter.

One may assume that spectral transmittance of an R filter 102 is illustrated in FIG. 1A, spectral transmittance of a G filter 104 is illustrated in FIG. 1B, and spectral transmittance of a B filter 106 is illustrated in FIG. 1C. Spectral transmittance of R filter 102 comprises a rectangle window from λ=600 nm to λ=700 nm having 100% spectral transmittance. Spectral transmittance of G filter 104 comprises a rectangle window from λ=500 nm to λ=600 nm wavelength having 100% spectral transmittance. Spectral transmittance of B filter 106 comprises a square window from λ=400 nm to λ=500 nm wavelength having 100% spectral transmittance.

Thus, spectral transmittance of R filter 102, spectral transmittance of G filter 104, and spectral transmittance of B filter 106 are not overlapping. Accordingly, one may assume that R pixels detect only R signal, G pixels detect only G signal, and B pixels detect only B signal.

Figures 2, 3:
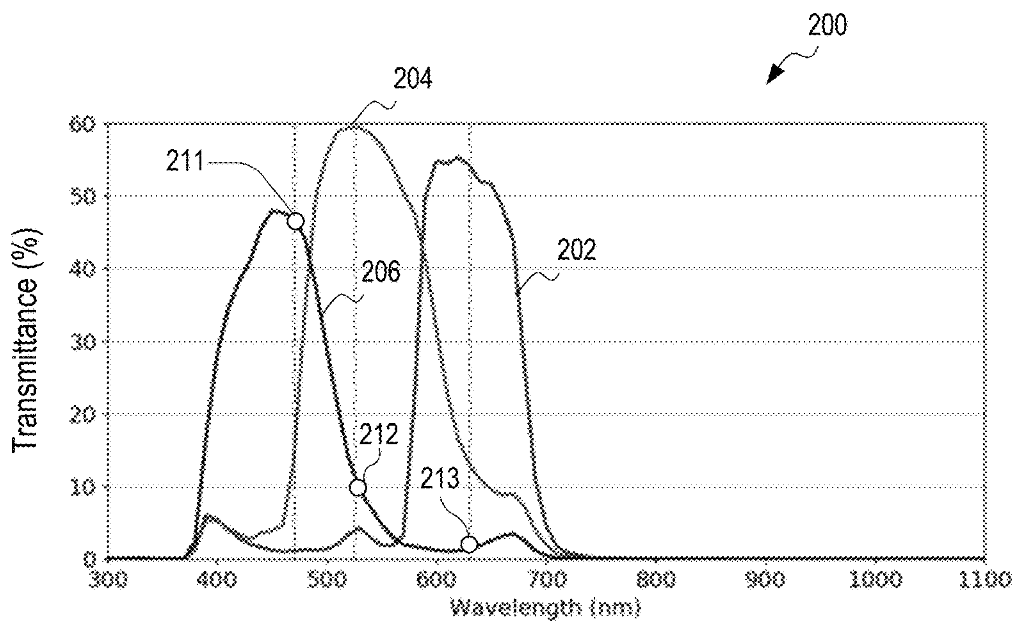
FIG. 2 shows a typical spectral transmittance of color filter.
FIG. 3 shows a color pixel array of an image sensor having Bayer pattern, according to an embodiment of the invention.

Because the spectral transmittance depends on the color filter material, spectral transmittance of R filter 102, spectral transmittance of G filter 104, and spectral transmittance of B filter 106, as shown in FIGS. 1A-1C may not be realistic. FIG. 2 shows an example of typical spectral transmittance curves 202, 204, and 206 of respective filters 102, 104, and 106. Curve 202 illustrates spectral transmittance of R filter. Curve 204 illustrates spectral transmittance of G filter. Curve 206 illustrates spectral transmittance of B filter.

While B filter is intended to filter light in B band (400-500 nm), light in G band (500-600 nm) and light in R band (600-700 nm) also pass through B filter, which has spectral transmittance curve 206, and are collected by B pixel. That is, curve 206 has non-zero spectral transmittance outside of the B band. Similarly, curves 204 and 202 have non-zero spectral transmittance outside of the G band and R band, respectively.

The precise amount of light in B band (400-500 nm), light in G band (500-600 nm), and light in R band (600-700 nm) detected in a B pixel covered by B filter may be calculated based on the spectral transmittance of the B filter (curve 206). For example, the amount of light detected is equivalent to the area under the spectral transmittance curve within the color band of interest. The spectral transmittance curve of a color filter is commonly provided by the color filter makers or it can be measured.

Alternatively, light in B band detected in B pixel may be approximated by point 211 at 470 nm approximately under the peak of curve 206, light in G band detected in B pixel may be approximated by point 212 at 525 nm approximately under the peak of curve 204, light in R band detected in B pixel may be approximated by point 213 at 630 nm approximately under the peak of curve 202.

It is also possible that point 211 is at 450 nm, the center of B band, point 212 is at 550 nm, the center of G band, and point 213 is at 650 nm, the center of R band. Other considerations and selections are also possible.

In an embodiment, for example, from curve 206 one may find that the light in B band detected in B pixel is approximately 48%, the light in G band detected in B pixel is approximately 10%, and the light in R band detected in B pixel is approximately 3%. The B pixel is under the B filter.

By this approximation, one may determine that the light intensity detected at the B pixel covered by B filter, IBpixel, can be expressed as:

$$IBpixel = 48\%\ B + 10\%\ G + 3\%\ R. \quad (1)$$

where B is B signal, which is light in B band, before passing through B filter, G is G signal, which is light in G band, before passing through B filter, and R is R signal, which is light in R band, before passing through B filter.

Equation (1) may be generalized and expressed as:

$$IBpixel = a31\ R + a32\ G + a33\ B. \quad (2)$$

In a same way, curve 202 will provide $$IRpixel = a11\ R + a12\ G + a13\ B, \quad (3)$$

and curve 204 will provide $$IGpixel = a21\ R + a22\ G + a23\ B. \quad (4)$$

where IRpixel is the light intensity detected at the R pixel covered by R filter, and IGpixel is the light intensity detected at the G pixel covered by G filter.

Thus, one will have a set of three linear equations:

$$IRpixel = a11\ R + a12\ G + a13\ B, \quad (5)$$

$$IGpixel = a21\ R + a22\ G + a23\ B, \quad (6)$$

$$IBpixel = a31\ R + a32\ G + a33\ B. \quad (7)$$

where IRpixel, IGpixel, and IBpixel are known from light detection at three pixels (R, G, B pixels), and a11, a12, a13, a21, a22, a23, a31, a32, and a33 are known from curves 202, 204, and 206. Notice that Equation (5) is the same as Equation (3), Equation (6) is the same as Equation (4), Equation (7) is the same as Equation (2).

In the set of three linear equations (5)-(7), R, G, and B are variables, a11, a12, a13, a21, a22, a23, a31, a32, and a33 are coefficients, and IRpixel, IGpixel, and IBpixel are constants.

Assuming R signals (Rs) in Equations (5)-(7) are the same, G signals (Gs) in Equations (5)-(7) are the same, and B signals (Bs) in Equations (5)-(7) are the same, one may determine the values of R, G, and B (variables R, G, and B) from Equations (5)-(7) by solving Equations (5)-(7). To assume or assure R signals, G signals, and B signals are the same in Equations (5)-(7), one may select neighboring R, G, and B pixels associated with Equations (5)-(7), as shown in FIG. 3, according to an embodiment of the invention.

R signal, G signal, and B signal at at-least one of R pixel, G pixel, and B pixel, may be determined by solving Equations (5)-(7) associated with the R pixel, G pixel, and B pixel. The R pixel, G pixel, and B pixel are neighboring pixels.

FIG. 3 shows a color pixel array 300 of an image sensor (not shown) having Bayer pattern, according to an embodiment of the invention. Color pixel array 300 comprises a plurality of R pixels, a plurality of G pixels, and a plurality of B pixels. A group of four color pixels form a Bayer unit 302. Bayer unit 302 comprises R pixel 304, G pixel 306, B pixel 308, and G pixel 310. It is appreciated that the color pixel array is not limited to Bayer pattern. Other configurations are possible, as far as the four color pixels are neighboring or closely grouped together.

In an embodiment, R pixel 304, G pixel 306, B pixel 308, and G pixel 310 form a square, which is Bayer unit 302. R pixel 304 is at left upper corner, G pixel 306 is at right upper corner, B pixel 308 is at right lower corner, and G pixel 310 is at left lower corner.

Light detected at R pixel 304 may be expressed as Equation (5), light detected at G pixel 306 may be expressed as Equation (6), light detected at B pixel 308 may be expressed as Equation (7). One may solve three linear equations (5)-(7), and obtain the values of R, G, and B. In this embodiment, all R pixel 304, G pixel 306, and B pixel 308 may have the same values of R, G, and B.

In an embodiment, light detected at G pixel 306 may be expressed as Equation (8), and light detected at G pixel 310 may be expressed as Equation (9).

$$IGpixel1 = a21\ R + a22\ G + a23\ B, \quad (8)$$

$$IGpixel2 = a21\ R + a22\ G + a23\ B, \quad (9)$$

where IGpixel1 is light intensity detected at G pixel 306 covered by G filter, and IGpixel2 is the intensity detected at G pixel 310 covered by G filter, and where a21, a22, and a23 in Equations (8) and (9) are the same, because the G filters at G pixels 306 and 310 are the same.

To solve three unknowns or variables, one may need a set of three linear equations with three unknowns or variables, no more or no less. Thus, an average of Equations (8) and (9) is taken. Equation (10) is an average of Equations (8) and (9):

$$(IGpixel1 + IGpixel2)/2 = a21\ R + a22\ G + a23\ B. \quad (10)$$

Thus, one may get a new set of three linear equations.

$$IRpixel = a11\ R + a12\ G + a13\ B, \quad (11)$$

$$(IGpixel1 + IGpixel2)/2 = a21\ R + a22\ G + a23\ B, \quad (12)$$

$$IBpixel = a31\ R + a32\ G + a33\ B, \quad (13)$$

where Equation (11) is the same as Equation (6), Equation (12) is the same as Equation (10), Equation (13) is the same as Equation (7). Similarly, a11, a12, a13, a21, a22, a23, a31, a32, and a33 are known from curves 202, 204, and 206.

In the set of three linear equations (11)-(13), R, G, and B are variables, a11, a12, a13, a21, a22, a23, a31, a32, and a33 are coefficients, and IRpixel, (IGpixel1+IGpixel2)/2, and IBpixel are constants.

In this embodiment, all R pixel 304, G pixels 306 and 310, and B pixel 308 may have the same values of R, G, and B. In other words, a Bayer unit has a value of R, a value of G, and a value of B.

Also, R signal, G signal, and B signal at at-least one of R pixel, G pixels, and B pixel of the Bayer unit, may be determined by solving Equations (11)-(13) associated with the R pixel, G pixels, and B pixel. The R pixel, G pixels, and B pixel are neighboring pixels, even if they are not in a Bayer unit.

To increase the resolution of R, G, and B signals, an interpolation like process may be performed. For simplicity, the interpolation like process may be recognized as interpolation. Without interpolation, each Bayer unit has a value of R, a value of G, and a value of B. In other words, R pixel, G pixels, and B pixel in the same Bayer unit have the same values of R, G, and B. With interpolation, R pixel, G pixels, and B pixel in the same Bayer unit have different values of R, G, and B, thus increasing the resolution of R, G, and B signals.

Figure 4:
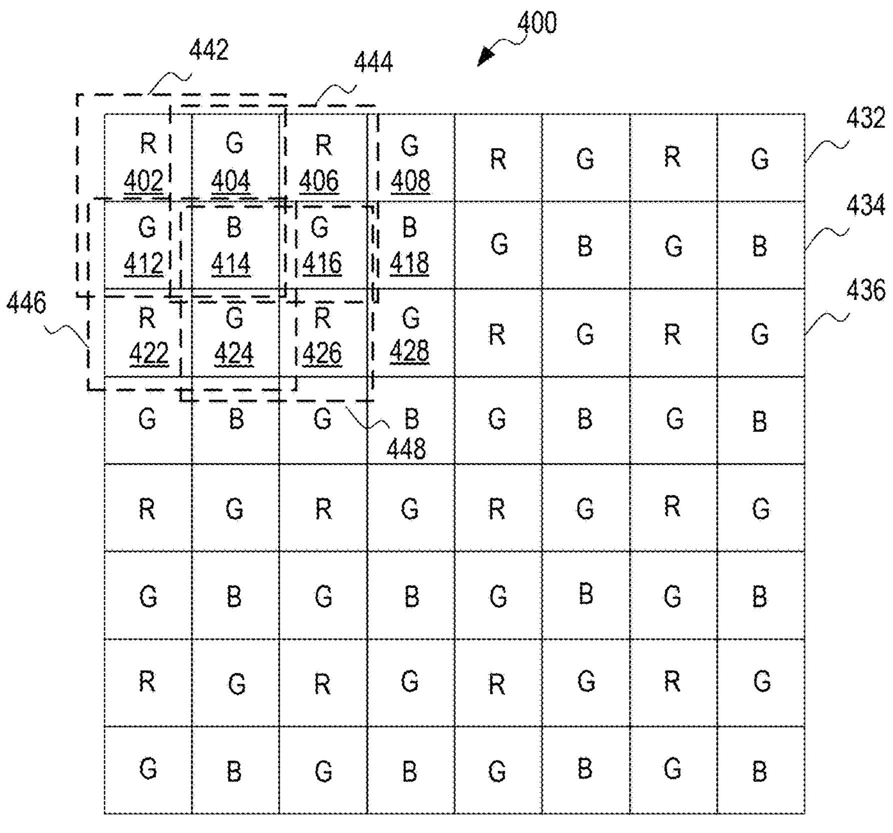
FIG. 4 shows an interpolation based on solving three linear equations, according to an embodiment of the invention.

FIG. 4 shows an interpolation based on solving three linear equations (11)-(13), according to an embodiment of the invention. FIG. 4 shows a color pixel array 400 of an image sensor (not shown) comprising a plurality of R pixels, a plurality of G pixels, and a plurality of B pixels. Color pixel array 400 comprises R pixel 402, G pixel 404, R pixel 406, G pixel 408, . . . in a first row 432 of pixel array 400, G pixel 412, B pixel 414, G pixel 416, B pixel 418, . . . in a second row 434 of pixel array 400, R pixel 422, G pixel 424, R pixel 426, G pixel 428, . . . in a third row 436 of pixel array 400, and so on.

In an embodiment, R pixel 402, G pixel 404, B pixel 414, and G pixel 412 form a square, which is a Bayer unit or group 442. R pixel 402 is at left upper corner, G pixel 404 is at right upper corner, B pixel 414 is at right lower corner, and G pixel 412 is at left lower corner. G pixel 404, R pixel 406, G pixel 416, and B pixel 414 form a square, which is a Bayer unit or group 444. G pixel 404 is at left upper corner, R pixel 406 is at right upper corner, G pixel 416 is at right lower corner, and R pixel 414 is at left lower corner.

G pixel 412, B pixel 414, G pixel 424, and R pixel 422 form a square, which is a Bayer unit or group 446. G pixel 412 is at left upper corner, B pixel 414 is at right upper corner, G pixel 424 is at right lower corner, and R pixel 422 is at left lower corner. B pixel 414, G pixel 416, R pixel 426, and G pixel 424 form a square, which is a Bayer unit or group 448. B pixel 414 is at left upper corner, G pixel 416 is at right upper corner, R pixel 426 is at right lower corner, and G pixel 424 is at left lower corner.

In a first step in row 432, R, G, and B values or signals at R pixel 402 are determined by solving three linear equations (11)-(13) of associated pixels, which are R pixel 402, G pixel 404, G pixel 412, and B pixel 414 in Bayer unit or group 442. IGpixel1 and IGpixel2 in Equation (12) are light intensity detected at G pixel 404 and G pixel 412, respectively. Equation (11) is associated with R pixel 402. Equation (12) is associated with G pixel 404 and G pixel 412. Equation (13) is associated with B pixel 414.

In a second step in row 432, Equation (12) is changed to Equation (12a) by replacing IGpixel2 with IGpixel3, where IGpixel3 is light intensity detected at G pixel 416.

$$(IGpixel1+IGpixel3)/2=a21\,R+a22\,G+a23\,B. \tag{12a}$$

Further in the second step in row 432, R, G, and B values or signals at G pixel 404 are determined by solving three linear equations (11), (12a), and (13) of associated pixels in Bayer unit or group 444. And so on. Equation (11) is associated with R pixel 406. Equation (12a) is associated with G pixel 404 and G pixel 416, where IGpixel1 is light intensity detected at G pixel 404, IGpixel3 is light intensity detected at G pixel 416. Equation (13) is associated with B pixel 414.

In a first step in row 434, R, G, and B values or signals at G pixel 412 are determined by solving three linear equations (11)-(13) of associated pixels, which are G pixel 412, B pixel 414, R pixel 422, and G pixel 424 in Bayer unit or group 446.

In a second step in row 434, R, G, and B values or signals at B pixel 414 are determined by solving three linear equations (11)-(13) of associated pixels, which are B pixel 414, G pixel 416, G pixel 424, and R pixel 426 in Bayer unit or group 448. And so on.

Consequently, each of R pixel 402, G pixel 404, G pixel 412, and B pixel 414 in group 442, which is similar to Bayer unit 302 in FIG. 3, has different R, G, and B values or signals. In contrast, R pixel 304, G pixel 306, G pixel 310, and B pixel 308 in Bayer unit 302 in FIG. 3, have the same R, G, and B values or signals.

In an embodiment, G pixel 310 of Bayer unit 302 in FIG. 3 is replaced by an IR pixel. An IR pixel is a pixel covered by an IR filter, and not covered by R, G, or B filter.

Figure 5:
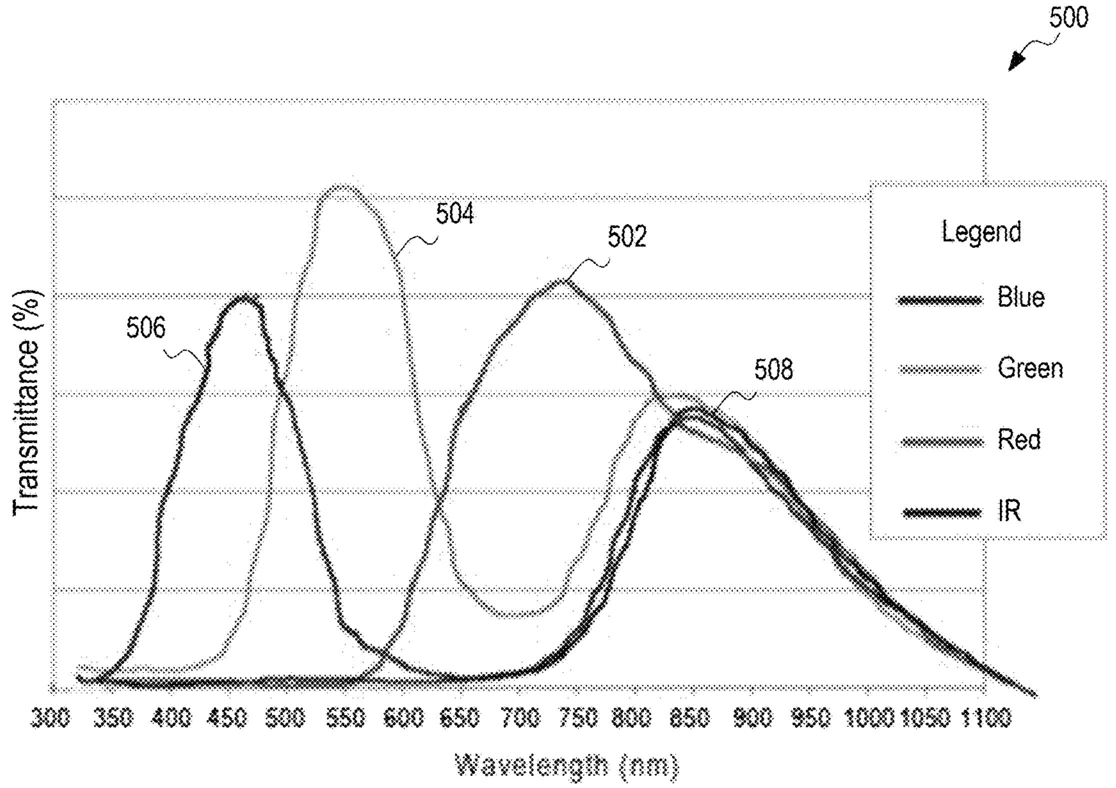
FIG. 5 shows a typical spectral transmittance of color filters covering a B band (400-500 nm), a G band (500-600 nm), a R band (600-700 nm), and an IR band (700-1100 nm).

FIG. 5 shows an example of typical spectral transmittance of color filter 500 covering B band (400-500 nm), G band (500-600 nm), R band (600-700 nm), and IR band (700-1100 nm). Curve 502 illustrates spectral transmittance of R filter. Curve 504 illustrates spectral transmittance of G filter. Curve 506 illustrates spectral transmittance of B filter. Curve 508 illustrates spectral transmittance of IR filter.

While B filter is intended to filter light in B band (400-500 nm) only, light in G band (500-600 nm), light in R band (600-700 nm), and light in IR band (700-1100 nm) also pass through B filter, which has spectral transmittance curve 506, and are collected by B pixel.

Figure 6:
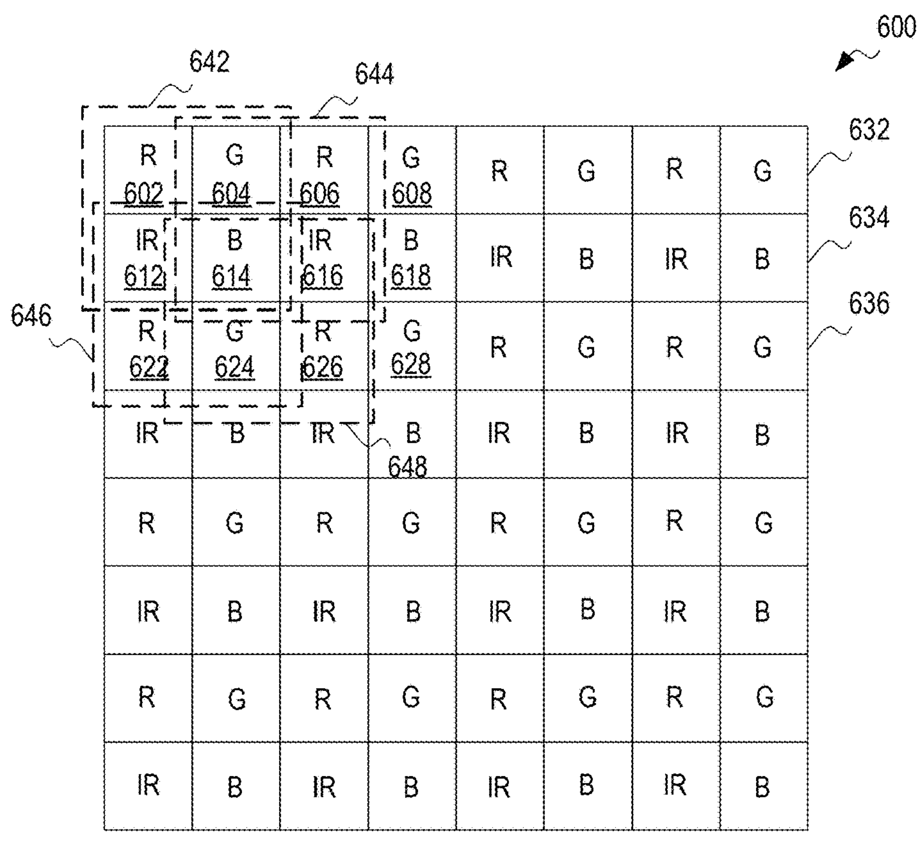
FIG. 6 shows a color pixel array of an image sensor comprising R, G, B, and IR pixels, according to an embodiment of the invention.

FIG. 6 shows a color pixel array 600 of an image sensor (not shown) comprising a plurality of R pixels, a plurality of G pixels, a plurality of B pixels, and a plurality of IR pixels, according to an embodiment of the invention. Color pixel array 600 comprises R pixel 602, G pixel 604, R pixel 606, G pixel 608, . . . in a first row 632 of pixel array 600, IR pixel 612, B pixel 614, IR pixel 616, B pixel 618, . . . in a second row 634 of pixel array 600, R pixel 622, G pixel 624, R pixel 626, G pixel 628, . . . in a third row 636 of pixel array 600, and so on.

Equations (5)-(7) have to be modified to include the detected IR light in R, G, B pixels. Equations (5)-(7) become Equations (14)-(16).

$$IRpixel=a11\,R+a12\,G+a13\,B+a14\,IR, \tag{14}$$

$$IGpixel=a21\,R+a22\,G+a23\,B+a24\,IR, \tag{15}$$

$$IBpixel=a31\,R+a32\,G+a33\,B+a34\,IR, \tag{16}$$

where a14 IR, a24 IR, and a34 IR are the detected IR light in R pixel, G, pixel, and B pixel, respectively.

In a same way, light detected at an IR pixel is expressed as $$IIRpixel=a41\,R+a42\,G+a43\,B+a44\,IR, \tag{17}$$

where IIRpixel is light intensity detected at IR pixel 612 covered by IR filter. Thus, one have a new set of four linear equations (14)-(17) for determining R, G, B, and IR signals at a pixel, which is R, G, B, or IR pixel.

In the set of four linear equations (14)-(17), R, G, B, and IR are variables, a11, a12, a13, a14, a21, a22, a23, a24, a31, a32, a33, a34, a41, a42, a43, and a44 are coefficients, and IRpixel, IGpixel, IBpixel, and IIRpixel are constants.

In a first step in row 632, R, G, B, and IR values or signals at R pixel 602 are determined by solving four linear equations (14)-(17) of associated pixels, which are R pixel 602, G pixel 604, IR pixel 612, and B pixel 614 in a group 642. Equation (14) is associated with R pixel 602. Equation (15) is associated with G pixel 604. Equation (16) is associated with B pixel 614. Equation (17) is associated with IR pixel 612.

In a second step in row 632, R, G, B, and IR values or signals at G pixel 604 are determined by solving four linear equations (14)-(17) of associated pixels in a pixel group 644. Equation (14) is associated with R pixel 606. Equation (15) is associated with G pixel 604. Equation (16) is associated with B pixel 614. Equation (17) is associated with IR pixel 616.

In a first step in row 634, R, G, B, and IR values or signals at IR pixel 612 are determined by solving four linear equations (14)-(17) of associated pixels, which are IR pixel 612, B pixel 614, R pixel 622, and G pixel 624 in a group 646.

In a second step in row 634, R, G, B, and IR values or signals at B pixel 614 are determined by solving four linear equations (14)-(17) of associated pixels, which are B pixel 614, IR pixel 616, G pixel 624, and R pixel 626 in a group 648. And so on.

Consequently, each of R pixel 602, G pixel 604, IR pixel 612, and B pixel 614 in Bayer unit or group 642, has different R, G, B, and IR values or signals. In contrast, R pixel 304, G pixel 306, G pixel 310, and B pixel 308 in Bayer unit 302 in FIG. 3, have the same R, G, and B values or signals.

Furthermore, R, G, and B signals, or R, G, B, and IR signals may be provided by a color filter array. Incoming light is filtered by color filter. In an embodiment, R, G, and B signals, or R, G, B, and IR signals may be provided by a color router based on metasurfaces. A color router changes the directions of light depending on wavelengths.

In an embodiment, four neighboring pixels having four or three different linear equations having four or three unknowns or variables are combined to solve the four or three unknowns. The four unknowns may be R, G, B, and IR signals. The three unknowns may be R, G, and B signals.

Figure 7:
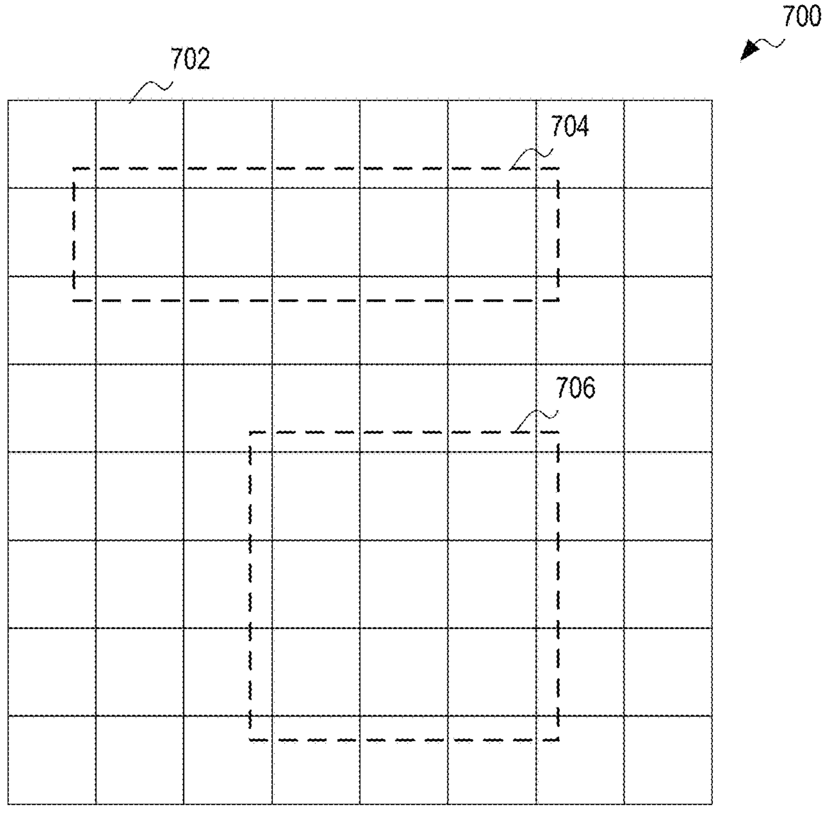
FIG. 7 shows a color pixel array of an image sensor, according to an embodiment of the invention.

FIG. 7 shows an image sensor having a color pixel array 700 comprising a plurality of color pixels 702, according to an embodiment of the invention. P neighboring color pixels of the plurality of color pixels form a group of color pixels. P is an integer. The group of color pixels may be arranged in a 1D (one-dimensional) array 704. The group of color pixels may also be arranged in a 2D (two-dimensional) array 706. Furthermore, the group of color pixels may be arranged in any shape having neighboring pixels. Each color pixel of the group of color pixels is associated with a different linear equation including P unknowns or variables. The P neighboring pixels are associated with P different linear equations. The P different linear equations may be combined to solve the P unknowns. The unknowns may be values or signals in certain color bands.

Figure 8:
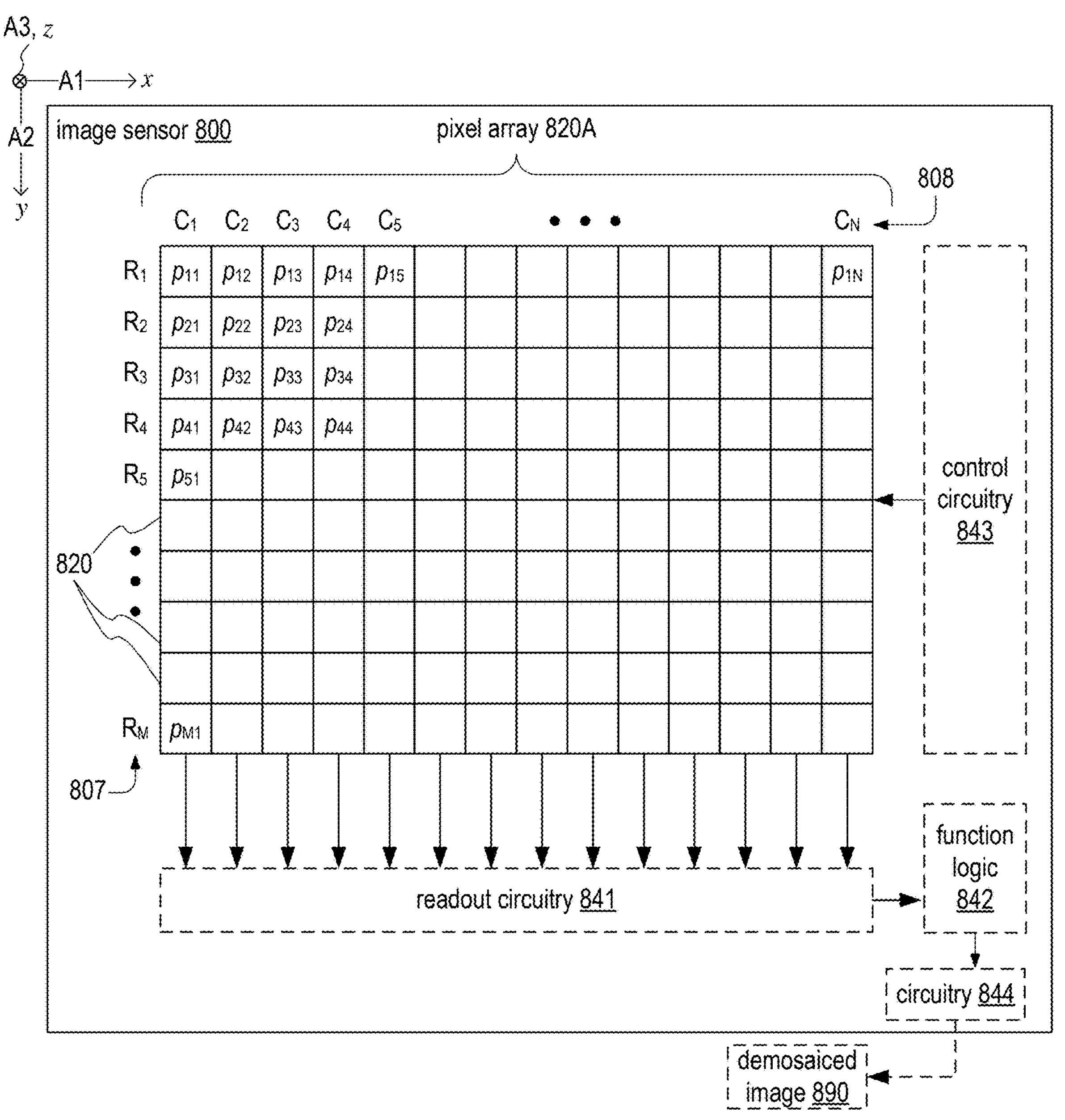
FIG. 8 is a functional block diagram of an image sensor, embodiments of which include the color pixel array of FIG. 6 or FIG. 7.

FIG. 8 is a functional block diagram of an image sensor 800. The cross-section illustrated in FIG. 8 is parallel to a plane formed by orthogonal axes A1 and A2, each of which is orthogonal to an axis A3. Image sensor 800 includes two-dimensional array of pixels 820 that form a pixel array 820A. Examples of pixel array 820A include pixel arrays 400, 600, and 700 of respective FIGS. 4, 6, and 7.

Pixel array 820A has M pixel rows 807 (1-M) and N pixel columns 808 (1-N), which are denoted in FIG. 8 as pixel rows $R_1, R_2, \ldots, R_M$ and pixel columns $C_1, C_2, \ldots, C_N$, respectively. In some embodiments, pixel array 820A may be wider along axis A1 than along axis A2, which may result from N exceeding M. Pixel array 820A may be wider along axis A2 than along axis A1, which may result from M exceeding N. Image sensor 800 may include a semiconductor slab that includes pixel array 820A.

Image sensor 800 may also include at least one of readout circuitry 841, function logic 842, and control circuitry 843. FIG. 8 also depicts circuitry 844, which may include a processor and/or memory. The processor itself may include a memory, which may store machine-readable instructions, e.g., as software or firmware. The processor may be, or include, an image signal processor (ISP). Circuitry 844 may be either part of image sensor 800, e.g., as part of function logic 842, or be communicatively coupled to image sensor 800. Circuitry 844 may output a demosaiced image 890.

After each pixel 820 has acquired its image charge, the image charge is read out by readout circuitry 841 through column bitlines and transferred to function logic 842. Image sensor 800 may further include control circuitry 843 coupled with pixel array 820A for generating various signals to control the operation of each pixel 820.

Each pixel 820 is denoted as $p_{mn}$, where indices m and n of pixel coordinate (m,n) denote, respectively, the row and column of the pixel within pixel array 820A. For example, FIG. 8 denotes selected pixels 820 of pixel rows $R_1$-$R_5$ and pixel columns $C_1$-$C_5$. Each 2×2 array of pixels $p_{mn}$ constitutes a respective Bayer unit. For example, pixels $p_{11}$, $p_{12}$, $p_{21}$, and $p_{22}$ constitute a first Bayer unit, examples of which include Bayer units 442 and 642. Pixels $p_{12}$, $p_{13}$, $p_{22}$, and $p_{23}$ constitute a second Bayer unit, examples of which include Bayer units 444 and 644. Pixels $p_{21}$, $p_{22}$, $p_{31}$, and $p_{32}$ constitute a third Bayer unit, examples of which include Bayer units 446 and 646.

FIG. 9 is a flowchart illustrating a method 900 for demosaicing an image captured by an image sensor (800). The image sensor has a pixel array (820A) that includes a first Bayer unit (442). The descriptions of methods herein include parenthetical numbers following terms recited by the method. These methods include methods 900, 1000, 1100, and 1200. The parenthetical number indicates that the element associated with the number in parentheses is an example of the term. For example, "image sensor (800)" above means that image sensor 800 is an example of the image sensor of method 900. Method 900 includes at least one of steps 910, 920, and 930.

Step 910 includes determining image-pixel values for a pixel of a first Bayer unit (442) of the pixel array. In step 910, the values R, G, and B of equations (8)-(13) are respective examples of the first red image-pixel value, the first green image-pixel value, and the first blue image-pixel value. In step 910, the red pixel may be generalized to be a "non-green pixel," such as a blue pixel. Hence, the red pixel may be replaced with a blue pixel, such that an example of the first Bayer unit is Bayer unit 448 of FIG. 4.

Step 910 may include at least one of steps 912 and 914. Step 912 includes determining, for a red pixel (402) of the first Bayer unit (442) and with circuitry (844) communicatively coupled to the pixel array, a first red image-pixel value, a first green image-pixel value, and a first blue image-pixel value.

Execution of step 912 results in each of a first, a second, and a third weighted sum of the first red, the first green, and the first blue image-pixel values is equal to a respective sensor-pixel value output by a pixel of the first Bayer unit. The first weighted sum of the first red, the first green, and the first blue image-pixel values equals a red sensor-pixel value output by the red pixel. The second weighted sum of the first red, the first green, and the first blue image-pixel values equals an average of a first green sensor-pixel value output by a first green pixel of the first Bayer unit and a second green sensor-pixel value output by a second green pixel of the first Bayer unit. The third weighted sum of the first red, the first green, and the first blue image-pixel values equals a blue sensor-pixel value output by a blue pixel of the first Bayer unit. The right-hand side of equations (11), (12), and (13) are respective examples of the first, second, and third weighted sums.

In embodiments, the red pixel is at an upper-left corner of the first Bayer unit; the first green pixel is at an upper-right corner of the first Bayer unit; the second green pixel is at a lower-left corner of the first Bayer unit; and the blue pixel is at a lower-right corner of the first Bayer unit. Step 914 introduces a second Bayer unit. In embodiments, the first green pixel is at the upper-left corner of the second Bayer unit; the second red pixel is at the upper-right corner of the second Bayer unit; the blue pixel is at the lower-left corner of the second Bayer unit; and the third green pixel is at the lower-right corner of the second Bayer unit.

The image sensor of method 900 may include a pixel array. In such embodiments, the red pixel is aligned beneath a red color filter of the color-filter array; each of the first and the second green pixels is aligned beneath a green color filter of the color-filter array; and the blue pixel is aligned beneath a blue color filter of the color-filter array.

In the first weighted sum of step 912, the first red, the first green, and the first blue image-pixel values may be weighted by respective weights $w_{11}$, $w_{12}$, and $w_{13}$, which are derived from a transmission spectrum of the red color filter at a red wavelength, a green wavelength, and a blue wavelength, respectively. Coefficients a11, a12, and a13 of equations (11)-(13) are respective examples of weights $w_{11}$, $w_{12}$, and $w_{13}$.

In the second weighted sum of step 912, the first red, the first green, and the first blue image-pixel values may be weighted by respective weights $w_{21}$, $w_{22}$, and $w_{23}$, which are derived from a transmission spectrum of the green color filter at the red wavelength, the green wavelength, and the blue wavelength, respectively. Coefficients a21, a22, and a23 of equations (11)-(13) are respective examples of weights $w_{21}$, $w_{22}$, and $w_{23}$.

In the third weighted sum of step 912, the first red, the first green, and the first blue image-pixel values may be weighted by respective weights $w_{31}$, $w_{32}$, and $w_{33}$, which are derived from a transmission spectrum of the blue color filter at the red wavelength, the green wavelength, and the blue wavelength, respectively. Coefficients a31, a32, and a33 of equations (11)-(13) are respective examples of weights $w_{31}$, $w_{32}$, and $w_{33}$.

The pixel array of method 900 may include a second Bayer unit (444) that partially overlaps the first Bayer unit and includes the first green pixel, the blue pixel, a second red pixel (406), and a third green pixel (416). In such embodiments, step 910 may include step 914. Step 914 includes determining, for the first green pixel (404) of the first Bayer unit and with the circuitry, a second red image-pixel value, a second green image-pixel value, and a second blue image-pixel value.

Execution of step 914 results in each of a fourth, a fifth and a sixth weighted sum of the second red, the second green, and the second blue image-pixel values is equal to a respective sensor-pixel value output by a pixel of the second Bayer unit. The fourth weighted sum equals a second red sensor-pixel value output by a second red pixel. The fifth weighted sum equals an average of the first green sensor-pixel value and a third green sensor-pixel value output by the third green pixel. The sixth weighted sum equals the blue sensor-pixel value.

In embodiments, the second red pixel is aligned beneath a red color filter of the color-filter array and the second green pixel is aligned beneath a green color filter of the color-filter array. In the fourth weighted sum of step 914, the second red, the first green, and the first blue image-pixel values may be weighted by aforementioned respective weights $w_{11}$, $w_{12}$, and $w_{13}$. In the fifth weighted sum of step 914, the second red, the first green, and the first blue image-pixel values may be weighted by aforementioned respective weights $w_{21}$, $w_{22}$, and $w_{23}$. In the sixth weighted sum of step 914, the second red, the first green, and the first blue image-pixel values may be weighted by aforementioned respective weights $w_{31}$, $w_{32}$, and $w_{33}$.

Step 920 includes outputting, by the circuitry, a demosaiced image (890). Step 920 may include step 922 such that the demosaiced image has, at a location in the demosaiced image corresponding to a location of the red pixel in the pixel array, a first RGB triplet that includes the first red image-pixel value, the first green image-pixel value, and the first blue image-pixel value. When step 910 includes step 914, step 920 may include step 924 such that the demosaiced image has, at a location in the demosaiced image corresponding to a location of the first green pixel in the pixel array, a second RGB triplet that includes the second red image-pixel value, the second green image-pixel value, and the second blue image-pixel value.

Step 930 includes reading, with readout circuitry (841) of the image sensor, each of the red sensor-pixel value, the first green sensor-pixel value, the second green sensor-pixel value, and the blue sensor-pixel value from the pixel array.

FIG. 10 is a flowchart illustrating a method 1000 for demosaicing an image captured by an image sensor (800). The image sensor has a pixel array (820A) that includes a first Bayer unit (642). Method 1000 is similar to method 900. In method 900, the color-filter array is an RGB color-filter array, as in pixel array 400. In method 900, the color filter array is an RGB-IR color-filter array, as in pixel array 600. Method 1000 includes at least one of steps 1010, 1020, and 1030, which are analogous to steps 910, 920, and 930, respectively Step 1010 includes determining image-pixel values for a pixel of a first Bayer unit (642) of the pixel array. In step 1010, the values R, G, B, and IR of equations (14)-(17) are respective examples of the first red image-pixel value, the first green image-pixel value, the first blue image pixel value, and the first IR image-pixel value. In step 1010, the red pixel may be generalized to be a "non-green pixel," such as a blue pixel. Hence, the red pixel may be replaced with a blue pixel, such that an example of the first Bayer unit is Bayer unit 648 of FIG. 6.

Step 1010 may include at least one of steps 1012 and 1014. Step 1012 includes determining, for a red pixel of the first Bayer unit (642) and with circuitry (844) communicatively coupled to the pixel array, a first red image-pixel value, a first green image-pixel value, a first blue image-pixel value, and a first infrared (IR) image-pixel value.

Execution of step 1012 results in each of a first, a second, a third, and a fourth weighted sum of the first red, the first green, the first blue, and the first IR image-pixel values is equal to a respective sensor-pixel value output by the red pixel. The first weighted sum equals a red sensor-pixel value output by the red pixel. The second weighted sum equals a green sensor-pixel value output by a green pixel of the first Bayer unit. The third weighted sum equals a blue sensor-pixel value output by a blue pixel of the first Bayer unit. The fourth weighted sum values equals an IR sensor-pixel value output by an IR pixel of the first Bayer unit. The right-hand side of equations (14), (15), (16), and (17) are respective examples of the first, second, third, and fourth weighted sums.

In embodiments, the red pixel is at an upper-left corner of the first Bayer unit; the first green pixel is at an upper-right corner of the first Bayer unit; the IR pixel is at a lower-left corner of the first Bayer unit; and the blue pixel is at a lower-right corner of the first Bayer unit. Step 1014 introduces a second Bayer unit (644). The green pixel is at an upper-left corner of the second Bayer unit; a second red pixel (606) is at an upper-right corner of the second Bayer unit; the blue pixel (614) is at a lower-left corner of the second Bayer unit; and the second IR pixel (616) is at a lower-right corner of the second Bayer unit.

The image sensor of method 1000 may include a pixel array. In such embodiments, the red pixel is aligned beneath a red color filter of the color-filter array; the green pixel is aligned beneath a green color filter of the color-filter array; the blue pixel is aligned beneath a blue color filter of the color-filter array; and the IR pixel is aligned beneath an IR color filter of the color-filter array.

In the first weighted sum of step 1012, the first red, the first green, the first blue, and the first IR image-pixel values are weighted by respective weights $w_{11}$, $w_{12}$, $w_{13}$, and $w_{14}$, which are derived from a transmission spectrum of the red color filter at a red wavelength, a green wavelength, a blue wavelength, and an IR wavelength, respectively. Coefficients a11, a12, a13, and a14 of equations (14)-(17) are respective examples of weights $w_{11}$, $w_{12}$, $w_{13}$, and $w_{14}$.

In the second weighted sum of step 1012, the first red, the first green, the first blue, and the first IR image-pixel values are weighted by respective weights $w_{21}$, $w_{22}$, $w_{23}$, and $w_{24}$, which are derived from a transmission spectrum of the green color filter at the red wavelength, the green wavelength, the blue wavelength, and the IR wavelength, respectively. Coefficients a21, a22, a23, and a24 of equations (14)-(17) are respective examples of weights $w_{21}$, $w_{22}$, $w_{23}$, and $w_{24}$.

In the third weighted sum of step 1012, the first red, the first green, the first blue, and the first IR image-pixel values are weighted by respective weights $w_{31}$, $w_{32}$, $w_{33}$, and $w_{34}$, which are derived from a transmission spectrum of the blue color filter at the red wavelength, the green wavelength, the blue wavelength, and the IR wavelength, respectively. Coefficients a31, a32, a33, and a34 of equations (14)-(17) are respective examples of weights $w_{31}$, $w_{32}$, $w_{33}$, and $w_{34}$.

In the fourth weighted sum of step 1012, the first red, the first green, the first blue, and the first IR image-pixel values are weighted by respective weights $w_{41}$, $w_{42}$, $w_{43}$, and $w_{44}$, which are derived from a transmission spectrum of the IR color filter at the red wavelength, the green wavelength, the blue wavelength, and the IR wavelength, respectively. Coefficients a41, a42, a43, and a44 of equations (14)-(17) are respective examples of weights $w_{41}$, $w_{42}$, and $w_{43}$, and $w_{44}$.

The pixel array of method 1000 may include a second Bayer unit (644) that partially overlaps the first Bayer unit and includes the first green pixel (604), the blue pixel (614), a second red pixel (606), and a second IR pixel (616). In such embodiments, step 1010 may include step 1014. Step 1014 includes determining, for the first green pixel of the first Bayer unit (604) and with the circuitry, a second red image-pixel value, a second green image-pixel value, and a second blue image-pixel value.

Execution of step 1014 results in each of a fifth, a sixth, a seventh, and an eighth weighted sum of the second red, the second green, the second blue, and the second IR image-pixel values being equal to a respective sensor-pixel value output by a pixel of the second Bayer unit. The fifth weighted sum equals the green sensor-pixel value. The sixth weighted sum equals a second red sensor-pixel value output by the second red pixel. The seventh weighted sum equals a second IR sensor-pixel value output by the second IR pixel. The eighth weighted sum equals the blue sensor-pixel value.

In embodiments, the second red pixel is aligned beneath a red color filter of the color-filter array, and the second IR pixel is aligned beneath an IR color filter of the color-filter array. In the fifth weighted sum, the second red, the second green, the second blue, and the second IR image-pixel values are weighted by the aforementioned respective weights $w_{11}$, $w_{12}$, and $w_{13}$, and $w_{14}$. In the sixth weighted sum, the second red, the second green, the second blue, and the second IR image-pixel values are weighted by the aforementioned respective weights $w_{21}$, $w_{22}$, and $w_{23}$, and $w_{24}$. In the seventh weighted sum, the second red, the second green, the second blue, and the second IR image-pixel values are weighted by the aforementioned respective weights $w_{31}$, $w_{32}$, and $w_{33}$, and $w_{34}$. In the eighth weighted sum, the second red, the second green, the second blue, and the second IR image-pixel values are weighted by the aforementioned respective weights $w_{41}$, $w_{42}$, and $w_{43}$, and $w_{44}$.

Step 1020 includes outputting, by the circuitry, a demosaiced image (890). Step 1020 may include step 1022 such that the demosaiced image has, at a location in the demosaiced image corresponding to a location of the red pixel in the pixel array, a first RGB quadruplet that includes the first red image-pixel value, the first green image-pixel value, first blue image-pixel value, and the first IR image-pixel value. When step 1010 includes step 1014, step 1020 may include step 1024 such that the demosaiced image has, at a location in the demosaiced image corresponding to a location of the green pixel in the pixel array, a second RGB quadruplet that includes the second red image-pixel value, the second green image-pixel value, the second blue image-pixel value, and the second IR image-pixel value.

Step 1030 includes reading, with readout circuitry (841) of the image sensor, each of the red sensor-pixel value, the green sensor-pixel value, the blue sensor-pixel value, and the IR sensor-pixel value from the pixel array.

FIG. 11 is a flowchart illustrating a method 1100 for demosaicing an image captured by an image sensor (800). The image sensor has a pixel array (820A) that includes a first Bayer unit (442). Method 1100 includes at least one of steps 1110, 920, and 930, the latter two of which are introduced and described as part of method 900, FIG. 9. Step 1110 may include at least one of steps 1112 and 1114. Steps 1110, 1112, and 1114 are equivalent to respective steps 910, 912, and 914 of method 900, with equations (5)-(7) replacing equations (11)-(13) used in method 900.

FIG. 12 is a flowchart illustrating a method 1200 for demosaicing an image captured by an image sensor (800). The image sensor has a pixel array (700, 820A) that includes a pixel group that includes a plurality of pixels, P in number. A first example of a pixel group is the Bayer units described herein, in which P=4. A second example of a pixel group is any array of Bayer units described herein. Pixel arrays 704 and 706, FIG. 7, are also examples of pixel groups of method 1200. As in FIG. 7, a pixel group may be arranged in any shape. Method 1200 includes at least one of steps 1210, 1220, and step 930 introduced in the description of method 900.

Step 1210 includes determining, for a first pixel of the pixel group and with circuitry (844) communicatively coupled to the pixel array, P image-pixel values such that, for each pixel of the plurality of pixels, a respective weighted sum of the P image-pixel values equals a sensor-pixel value output by the pixel. Examples of the weighted sum include those of equations (5)-(7), (10)-(13), and (15)-(17).

Step 1220 includes outputting, by the circuitry, a demosaiced image (890) having, at a location in the demosaiced image corresponding to a location of the first pixel in the pixel array, an image-pixel-value array that includes each of the P image-pixel values.

Method 1200 may also include, for each of pixel of the plurality of pixels other than the first pixel, repeating said determining of step 1210 and said outputting of step 1220.

Combinations of Features

Features described above, as well as those claimed below, may be combined in various ways without departing from the scope hereof. The following enumerated examples illustrate some possible, non-limiting combinations.

Embodiment 1 is a method for demosaicing an image captured by an image sensor having a pixel array that includes a first Bayer unit. The method includes determining, for a red pixel of the first Bayer unit and with circuitry communicatively coupled to the pixel array, a first red image-pixel value, a first green image-pixel value, and a first blue image-pixel value such that each of a first, a second, and a third weighted sum of the first red, the first green, and the first blue image-pixel values is equal to a respective sensor-pixel value output by a pixel of the first Bayer unit. The first weighted sum equals a red sensor-pixel value output by the red pixel. The second weighted sum equals an average of a first green sensor-pixel value output by a first green pixel of the first Bayer unit and a second green sensor-pixel value output by a second green pixel of the first Bayer unit. The third weighted sum equals a blue sensor-pixel value output by a blue pixel of the first Bayer unit. The method also includes outputting, by the circuitry, a demosaiced image having, at a location in the demosaiced image corresponding to a location of the red pixel in the pixel array, a first RGB triplet that includes the first red image-pixel value, the first green image-pixel value, and the first blue image-pixel value.

Embodiment 2. The method of embodiment 1, the image sensor including a color-filter array, the red pixel being aligned beneath a red color filter of the color-filter array; each of the first and the second green pixels being aligned beneath a green color filter of the color-filter array; and the blue pixel being aligned beneath a blue color filter of the color-filter array; wherein: in the first weighted sum, the first red, the first green, and the first blue image-pixel values are weighted by respective weights $w_{11}$, $w_{12}$, and $w_{13}$, which are derived from a transmission spectrum of the red color filter at a red wavelength, a green wavelength, and a blue wavelength, respectively; in the second weighted sum, the first red, the first green, and the first blue image-pixel values are weighted by respective weights $w_{21}$, $w_{22}$, and $w_{23}$, which are derived from a transmission spectrum of the green color filter at the red wavelength, the green wavelength, and the blue wavelength, respectively; and in the third weighted sum, the first red, the first green, and the first blue image-pixel values are weighted by respective weights $w_{31}$, $w_{32}$, and $w_{33}$, which are derived from a transmission spectrum of the blue color filter at the red wavelength, the green wavelength, and the blue wavelength, respectively.

Embodiment 3. The method of either one of embodiments 1 or 2, further comprising: reading, with readout circuitry of the image sensor, each of the red sensor-pixel value, the first green sensor-pixel value, the second green sensor-pixel value, and the blue sensor-pixel value from the pixel array.

Embodiment 4. The method of any one of embodiments 1-3, the circuitry being an image signal processor that is part of the image sensor or communicatively coupled to the image sensor.

Embodiment 5. The method of any one of embodiments 1-4, the red pixel being at an upper-left corner of the first Bayer unit; the first green pixel being at an upper-right corner of the first Bayer unit; the second green pixel being at a lower-left corner of the first Bayer unit; and the blue pixel being at a lower-right corner of the first Bayer unit.

Embodiment 6. The method of embodiment 5, the pixel array including a second Bayer unit that partially overlaps the first Bayer unit and includes the first green pixel, the blue pixel, a second red pixel, and a third green pixel, the method further comprising: determining, for the first green pixel of the first Bayer unit and with the circuitry, a second red image-pixel value, a second green image-pixel value, and a second blue image-pixel value such that: a fourth weighted sum of the second red, the second green, and the second blue image-pixel values equals a second red sensor-pixel value output by a second red pixel; a fifth weighted sum of the second red, the second green, and the second blue image-pixel values equals an average of the first green sensor-pixel value and a third green sensor-pixel value output by the third green pixel; and a sixth weighted sum of the second red, the second green, and the second blue image-pixel values equals the blue sensor-pixel value; wherein, in said outputting, the demosaiced image having, at a location in the demosaiced image corresponding to a location of the first green pixel in the pixel array, a second RGB triplet that includes the second red image-pixel value, the second green image-pixel value, and the second blue image-pixel value.

Embodiment 7. The method of embodiment 6, the first green pixel being at the upper-left corner of the second Bayer unit; the second red pixel being at the upper-right corner of the second Bayer unit; the blue pixel being at the lower-left corner of the second Bayer unit; and the third green pixel being at the lower-right corner of the second Bayer unit.

Embodiment 8. The method of either one of embodiments 6 or 7, the image sensor including a color-filter array, the second red pixel being aligned beneath a red color filter of the color-filter array; second green pixel being aligned beneath a green color filter of the color-filter array; and wherein: in the fourth weighted sum, the second red, the first green, and the first blue image-pixel values are weighted by respective weights $w_{11}$, $w_{12}$, and $w_{13}$, which are derived from a transmission spectrum of the red color filter at a red wavelength, a green wavelength, and a blue wavelength, respectively; in the fifth weighted sum, the second red, the first green, and the first blue image-pixel values are weighted by respective weights $w_{21}$, $w_{22}$, and $w_{23}$, which are derived from a transmission spectrum of the green color filter at the red wavelength, the green wavelength, and the blue wavelength, respectively; and in the sixth weighted sum, the second red, the first green, and the first blue image-pixel values are weighted by respective weights $w_{31}$, $w_{32}$, and $w_{33}$, which are derived from a transmission spectrum of the blue color filter at the red wavelength, the green wavelength, and the blue wavelength, respectively.

Embodiment 9 is a method for demosaicing an image captured by an image sensor having a pixel array that includes a first Bayer unit. The method includes determining, for a red pixel of the first Bayer unit and with circuitry communicatively coupled to the pixel array, a first red image-pixel value, a first green image-pixel value, a first blue image-pixel value, and a first infrared (IR) image-pixel value such that each of a first, a second, a third, and a fourth weighted sum of the first red, the first green, the first blue, and first IR image-pixel values is equal to a respective sensor-pixel value output by a pixel of the first Bayer unit. The first weighted sum equals a red sensor-pixel value output by the red pixel. The second weighted sum equals a green sensor-pixel value output by a green pixel of the first Bayer unit. The third weighted sum equals a blue sensor-pixel value output by a blue pixel of the first Bayer unit. The fourth weighted sum values equals an IR sensor-pixel value output by an IR pixel of the first Bayer unit. The method also includes outputting, by the circuitry, a demosaiced image having, at a location in the demosaiced image corresponding to a location of the red pixel in the pixel array, a first RGB quadruplet that includes the first red image-pixel value, the first green image-pixel value, first blue image-pixel value, and the first IR image-pixel value.

Embodiment 10. The method of embodiment 9, the red pixel being at an upper-left corner of the first Bayer unit; the green pixel being at an upper-right corner of the first Bayer unit; the IR pixel being at a lower-left corner of the first Bayer unit; and the blue pixel being at a lower-right corner of the first Bayer unit.

Embodiment 11. The method of embodiment 10, the pixel array including a second Bayer unit that partially overlaps the first Bayer unit and includes the green pixel, the blue pixel, a second red pixel, and a second IR pixel, the method further comprising: determining, for the green pixel of the first Bayer unit and with the circuitry, a second red image-pixel value, a second green image-pixel value, a second blue image-pixel value, and a second IR image-pixel value such that: a fifth weighted sum of the second red, the second green, the second blue, and the second IR image-pixel values equals the green sensor-pixel value; a sixth weighted sum of the second red, the second green, the second blue, and the second IR image-pixel values equals a second red sensor-pixel value output by the second red pixel; a seventh weighted sum of the second red, the second green, the second blue, and the second IR image-pixel values equals a second IR sensor-pixel value output by the second IR pixel; and an eighth weighted sum of the second red, the second green, the second blue, and the second IR image-pixel values equals the blue sensor-pixel value; wherein, in said outputting, the demosaiced image having, at a location in the demosaiced image corresponding to a location of the green pixel in the pixel array, a second RGB quadruplet that includes the second red image-pixel value, the second green image-pixel value, the second blue image-pixel value, and the second IR image-pixel value.

Embodiment 12. The method of embodiment 11, the green pixel being at an upper-left corner of the second Bayer unit; the second red pixel being at an upper-right corner of the second Bayer unit; the blue pixel being at a lower-left corner of the second Bayer unit; and the second IR pixel being at a lower-right corner of the second Bayer unit.

Embodiment 13. The method of any one of embodiments 9-12, the image sensor including a color-filter array, the red pixel being aligned beneath a red color filter of the color-filter array; the green pixel being aligned beneath a green color filter of the color-filter array; the blue pixel being aligned beneath a blue color filter of the color-filter array; and the IR pixel being aligned beneath an IR color filter of the color-filter array wherein: in the first weighted sum, the first red, the first green, the first blue, and the first IR image-pixel values are weighted by respective weights $w_{11}$, $w_{12}$, $w_{13}$, and $w_{14}$, which are derived from a transmission spectrum of the red color filter at a red wavelength, a green wavelength, a blue wavelength, and an IR wavelength, respectively; in the second weighted sum, the first red, the first green, the first blue, and the first IR image-pixel values are weighted by respective weights $w_{21}$, $w_{22}$, $w_{23}$, and $w_{24}$, which are derived from a transmission spectrum of the green color filter at the red wavelength, the green wavelength, the blue wavelength, and the IR wavelength, respectively; in the third weighted sum, the first red, the first green, the first blue, and the first IR image-pixel values are weighted by respective weights $w_{31}$, $w_{32}$, $w_{33}$, and $w_{34}$, which are derived from a transmission spectrum of the blue color filter at the red wavelength, the green wavelength, the blue wavelength, and the IR wavelength, respectively; and in the fourth weighted sum, the first red, the first green, the first blue, and the first IR image-pixel values are weighted by respective weights $w_{41}$, $w_{42}$, $w_{43}$, and $w_{44}$, which are derived from a transmission spectrum of the IR color filter at the red wavelength, the green wavelength, the blue wavelength, and the IR wavelength, respectively.

Embodiment 14. The method of any one of embodiments 9-13, further comprising: reading, with readout circuitry of the image sensor, each of the red sensor-pixel value, the green sensor-pixel value, the blue sensor-pixel value, and the IR sensor-pixel value from the pixel array.

Embodiment 15. The method of any one of embodiments 9-14, the circuitry being an image signal processor that is part of the image sensor or communicatively coupled to the image sensor.

Embodiment 16. The method of any one of embodiments 11-15, the image sensor including a color-filter array, the green pixel being aligned beneath a green color filter of the color-filter array; the blue pixel being aligned beneath a blue color filter of the color-filter array; the second red pixel being aligned beneath a red color filter of the color-filter array; and the second IR pixel being aligned beneath an IR color filter of the color-filter array wherein: in the fifth weighted sum, the second red, the second green, the second blue, and the second IR image-pixel values are weighted by respective weights $w_{11}$, $w_{12}$, $w_{13}$, and $w_{14}$, which are derived from a transmission spectrum of the red color filter at a red wavelength, a green wavelength, a blue wavelength, and an IR wavelength, respectively; in the sixth weighted sum, the second red, the second green, the second blue, and the second IR image-pixel values are weighted by respective weights $w_{21}$, $w_{22}$, ad $w_{23}$, and $w_{24}$, which are derived from a transmission spectrum of the green color filter at the red wavelength, the green wavelength, the blue wavelength, and the IR wavelength, respectively; in the seventh weighted sum, the second red, the second green, the second blue, and the second IR image-pixel values are weighted by respective weights $w_{31}$, $w_{32}$, $w_{33}$, and $w_{34}$, which are derived from a transmission spectrum of the blue color filter at the red wavelength, the green wavelength, the blue wavelength, and the IR wavelength, respectively; and in the eighth weighted sum, the second red, the second green, the second blue, and the second IR image-pixel values are weighted by respective weights $w_{41}$, $w_{42}$, $w_{43}$, and $w_{44}$, which are derived from a transmission spectrum of the IR color filter at the red wavelength, the green wavelength, the blue wavelength, and the IR wavelength, respectively.

Embodiment 17. A method for demosaicing an image captured by an image sensor having a pixel array that includes a Bayer unit, the method comprising: determining, for a red pixel of the Bayer unit and with circuitry communicatively coupled to the pixel array, a first red image-pixel value, a first green image-pixel value, and a first blue image-pixel value such that: a first weighted sum of the first red, the first green, and the first blue image-pixel values equals a red sensor-pixel value output by the red pixel; a second weighted sum of the first red, the first green, and the first blue image-pixel values equals a green sensor-pixel value output by a green pixel of the Bayer unit that is adjacent to the red pixel; and a third weighted sum of the first red, the first green, and the first blue image-pixel values equals a blue sensor-pixel value output by a blue pixel of the Bayer unit that is adjacent to at least one of the red pixel and the blue pixel; and outputting, by the circuitry, a demosaiced image having, at a location in the demosaiced image corresponding to a location of the red pixel in the pixel array, a first RGB triplet that includes the first red image-pixel value, the first green image-pixel value, and the first blue image-pixel value.

Embodiment 18. The method of embodiment 17, the image sensor including a color-filter array, the red pixel, the green pixel, and the blue pixel being aligned, respectively, beneath a red color filter, a green color filter, and a blue color filter, of the color-filter array; wherein: in the first weighted sum, the first red, the first green, and the first blue image-pixel values are weighted by respective weights $w_{11}$, $w_{12}$, and $w_{13}$, which are derived from a transmission spectrum of the red color filter at a red wavelength, a green wavelength, and a blue wavelength, respectively; in the second weighted sum, the first red, the first green, and the first blue image-pixel values are weighted by respective weights $w_{21}$, $w_{22}$, and $w_{23}$, which are derived from a transmission spectrum of the green color filter at the red wavelength, the green wavelength, and the blue wavelength, respectively; and in the third weighted sum, the first red, the first green, and the first blue image-pixel values are weighted by respective weights $w_{31}$, $w_{32}$, and $w_{33}$, which are derived from a transmission spectrum of the blue color filter at the red wavelength, the green wavelength, and the blue wavelength, respectively.

Embodiment 19. A method for demosaicing an image captured by an image sensor having a pixel array that includes a pixel group that includes a plurality of pixels, in number, the method comprising: determining, for a first pixel of the pixel group and with circuitry communicatively coupled to the pixel array, image-pixel values such that, for each pixel of the plurality of pixels, a respective weighted sum of the image-pixel values equals a sensor-pixel value output by the pixel; and outputting, by the circuitry, a demosaiced image having, at a location in the demosaiced image corresponding to a location of the first pixel in the pixel array, an image-pixel-value array that includes each of the image-pixel values.

Embodiment 20. The method of embodiment 19, further comprising, for each of pixel of the plurality of pixels other than the first pixel, repeating said determining and said outputting.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments.

As used in this specification, any appendices thereto, and the appended claims, the singular forms "a," "an," and "the" include plural referents unless the content clearly dictates otherwise. It should also be noted that the term "or" is generally employed in its sense including "and/or" unless the content clearly dictates otherwise. Regarding instances of the terms "and/or" and "at least one of," for example, in the cases of "A and/or B," "at least one of A and B," and "at least one of A or B," such phrasing encompasses the selection of (i) A only, or (ii) B only, or (iii) both A and B. In the cases of "A, B, and/or C," "at least one of A, B, and C," and "at least one of A, B, or C," such phrasing encompasses the selection of (i) A only, or (ii) B only, or (iii) C only, or (iv) A and B only, or (v) A and C only, or (vi) Band C only, or (vii) each of A and B and C. This may be extended for as many items as are listed.

The following claims are intended to cover all generic and specific features described herein, as well as all statements of the scope of the present method and system, which, as a matter of language, might be said to fall therebetween.

I claim:

1. A method for demosaicing an image captured by an image sensor having a pixel array that includes a first Bayer unit, the method comprising:

determining, for a red pixel of the first Bayer unit and with circuitry communicatively coupled to the pixel array, a first red image-pixel value, a first green image-pixel value, and a first blue image-pixel value such that:

a first weighted sum of the first red, the first green, and the first blue image-pixel values equals a red sensor-pixel value output by the red pixel;

a second weighted sum of the first red, the first green, and the first blue image-pixel values equals an average of a first green sensor-pixel value output by a first green pixel of the first Bayer unit and a second green sensor-pixel value output by a second green pixel of the first Bayer unit; and a third weighted sum of the first red, the first green, and the first blue image-pixel values equals a blue sensor-pixel value output by a blue pixel of the first Bayer unit; and outputting, by the circuitry, a demosaiced image having, at a location in the demosaiced image corresponding to a location of the red pixel in the pixel array, a first RGB triplet that includes the first red image-pixel value, the first green image-pixel value, and the first blue image-pixel value.

2. The method of claim 1, the image sensor including a color-filter array, the red pixel being aligned beneath a red color filter of the color-filter array;

each of the first and the second green pixels being aligned beneath a green color filter of the color-filter array; and the blue pixel being aligned beneath a blue color filter of the color-filter array;

wherein:

in the first weighted sum, the first red, the first green, and the first blue image-pixel values are weighted by respective weights $w_{11}$, $w_{12}$, and $w_{13}$, which are derived from a transmission spectrum of the red color filter at a red wavelength, a green wavelength, and a blue wavelength, respectively;

in the second weighted sum, the first red, the first green, and the first blue image-pixel values are weighted by respective weights $w_{21}$, $w_{22}$, and $w_{23}$, which are derived from a transmission spectrum of the green color filter at the red wavelength, the green wavelength, and the blue wavelength, respectively; and in the third weighted sum, the first red, the first green, and the first blue image-pixel values are weighted by respective weights $w_{31}$, $w_{32}$, and $w_{33}$, which are derived from a transmission spectrum of the blue color filter at the red wavelength, the green wavelength, and the blue wavelength, respectively.

3. The method of claim 1, further comprising:

reading, with readout circuitry of the image sensor, each of the red sensor-pixel value, the first green sensor-pixel value, the second green sensor-pixel value, and the blue sensor-pixel value from the pixel array.

4. The method of claim 1, the circuitry being an image signal processor that is part of the image sensor or communicatively coupled to the image sensor.

5. The method of claim 1, the red pixel being at an upper-left corner of the first Bayer unit;

the first green pixel being at an upper-right corner of the first Bayer unit;

the second green pixel being at a lower-left corner of the first Bayer unit; and the blue pixel being at a lower-right corner of the first Bayer unit.

6. The method of claim 5, the pixel array including a second Bayer unit that partially overlaps the first Bayer unit and includes the first green pixel, the blue pixel, a second red pixel, and a third green pixel, the method further comprising:

determining, for the first green pixel of the first Bayer unit and with the circuitry, a second red image-pixel value, a second green image-pixel value, and a second blue image-pixel value such that:

a fourth weighted sum of the second red, the second green, and the second blue image-pixel values equals a second red sensor-pixel value output by a second red pixel;

a fifth weighted sum of the second red, the second green, and the second blue image-pixel values equals an average of the first green sensor-pixel value and a third green sensor-pixel value output by the third green pixel; and a sixth weighted sum of the second red, the second green, and the second blue image-pixel values equals the blue sensor-pixel value;

wherein, in said outputting, the demosaiced image having, at a location in the demosaiced image corresponding to a location of the first green pixel in the pixel array, a second RGB triplet that includes the second red image-pixel value, the second green image-pixel value, and the second blue image-pixel value.

7. The method of claim 6, the first green pixel being at the upper-left corner of the second Bayer unit;

the second red pixel being at the upper-right corner of the second Bayer unit;

the blue pixel being at the lower-left corner of the second Bayer unit; and the third green pixel being at the lower-right corner of the second Bayer unit.

8. The method of claim 6, the image sensor including a color-filter array, the second red pixel being aligned beneath a red color filter of the color-filter array;

second green pixel being aligned beneath a green color filter of the color-filter array; and wherein:

in the fourth weighted sum, the second red, the first green, and the first blue image-pixel values are weighted by respective weights $w_{11}$, $w_{12}$, and $w_{13}$, which are derived from a transmission spectrum of the red color filter at a red wavelength, a green wavelength, and a blue wavelength, respectively;

in the fifth weighted sum, the second red, the first green, and the first blue image-pixel values are weighted by respective weights $w_{21}$, $w_{22}$, and $w_{23}$, which are derived from a transmission spectrum of the green color filter at the red wavelength, the green wavelength, and the blue wavelength, respectively; and in the sixth weighted sum, the second red, the first green, and the first blue image-pixel values are weighted by respective weights $w_{31}$, $w_{32}$, and $w_{33}$, which are derived from a transmission spectrum of the blue color filter at the red wavelength, the green wavelength, and the blue wavelength, respectively.

9. A method for demosaicing an image captured by an image sensor having a pixel array that includes a first Bayer unit, the method comprising:

determining, for a red pixel of the first Bayer unit and with circuitry communicatively coupled to the pixel array, a first red image-pixel value, a first green image-pixel value, a first blue image-pixel value, and first infrared (IR) image-pixel value such that:

a first weighted sum of the first red, the first green, the first blue, and the first IR image-pixel values equals a red sensor-pixel value output by the red pixel;

a second weighted sum of the first red, the first green, the first blue, and the first IR image-pixel values equals a green sensor-pixel value output by a green pixel of the first Bayer unit;

a third weighted sum of the first red, the first green, the first blue, and the first IR image-pixel values equals a blue sensor-pixel value output by a blue pixel of the first Bayer unit; and a fourth weighted sum of the first red, the first green, the first blue, and the first IR image-pixel values equals an IR sensor-pixel value output by an IR pixel of the first Bayer unit; and outputting, by the circuitry, a demosaiced image having, at a location in the demosaiced image corresponding to a location of the red pixel in the pixel array, a first RGB quadruplet that includes the first red image-pixel value, the first green image-pixel value, first blue image-pixel value, and the first IR image-pixel value.

10. The method of claim 9, the red pixel being at an upper-left corner of the first Bayer unit;

the green pixel being at an upper-right corner of the first Bayer unit;

the IR pixel being at a lower-left corner of the first Bayer unit; and the blue pixel being at a lower-right corner of the first Bayer unit.

11. The method of claim 10, the pixel array including a second Bayer unit that partially overlaps the first Bayer unit and includes the green pixel, the blue pixel, a second red pixel, and a second IR pixel, the method further comprising:

determining, for the green pixel of the first Bayer unit and with the circuitry, a second red image-pixel value, a second green image-pixel value, a second blue image-pixel value, and a second IR image-pixel value such that:

a fifth weighted sum of the second red, the second green, the second blue, and the second IR image-pixel values equals the green sensor-pixel value;

a sixth weighted sum of the second red, the second green, the second blue, and the second IR image-pixel values equals a second red sensor-pixel value output by the second red pixel;

a seventh weighted sum of the second red, the second green, the second blue, and the second IR image-pixel values equals a second IR sensor-pixel value output by the second IR pixel; and an eighth weighted sum of the second red, the second green, the second blue, and the second IR image-pixel values equals the blue sensor-pixel value;

wherein, in said outputting, the demosaiced image having, at a location in the demosaiced image corresponding to a location of the green pixel in the pixel array, a second RGB quadruplet that includes the second red image-pixel value, the second green image-pixel value, the second blue image-pixel value, and the second IR image-pixel value.

12. The method of claim 11, the green pixel being at an upper-left corner of the second Bayer unit;

the second red pixel being at an upper-right corner of the second Bayer unit;

the blue pixel being at a lower-left corner of the second Bayer unit; and the second IR pixel being at a lower-right corner of the second Bayer unit.

13. The method of claim 9, the image sensor including a color-filter array, the red pixel being aligned beneath a red color filter of the color-filter array;

the green pixel being aligned beneath a green color filter of the color-filter array;

the blue pixel being aligned beneath a blue color filter of the color-filter array; and the IR pixel being aligned beneath an IR color filter of the color-filter array wherein:

in the first weighted sum, the first red, the first green, the first blue, and the first IR image-pixel values are weighted by respective weights $w_{11}$, $w_{12}$, $w_{13}$, and $w_{14}$, which are derived from a transmission spectrum of the red color filter at a red wavelength, a green wavelength, a blue wavelength, and an IR wavelength, respectively;

in the second weighted sum, the first red, the first green, the first blue, and the first IR image-pixel values are weighted by respective weights $w_{21}$, $w_{22}$, $w_{23}$, and $w_{24}$, which are derived from a transmission spectrum of the green color filter at the red wavelength, the green wavelength, the blue wavelength, and the IR wavelength, respectively;

in the third weighted sum, the first red, the first green, the first blue, and the first IR image-pixel values are weighted by respective weights $w_{31}$, $w_{32}$, $w_{33}$, and $w_{34}$, which are derived from a transmission spectrum of the blue color filter at the red wavelength, the green wavelength, the blue wavelength, and the IR wavelength, respectively; and in the fourth weighted sum, the first red, the first green, the first blue, and the first IR image-pixel values are weighted by respective weights $w_{41}$, $w_{42}$, and $w_{43}$, and $w_{44}$, which are derived from a transmission spectrum of the IR color filter at the red wavelength, the green wavelength, the blue wavelength, and the IR wavelength, respectively.

14. The method of claim 9, further comprising:

reading, with readout circuitry of the image sensor, each of the red sensor-pixel value, the green sensor-pixel value, the blue sensor-pixel value, and the IR sensor-pixel value from the pixel array.

15. The method of claim 9, the circuitry being an image signal processor that is part of the image sensor or communicatively coupled to the image sensor.

16. The method of claim 11, the image sensor including a color-filter array, the green pixel being aligned beneath a green color filter of the color-filter array;

the blue pixel being aligned beneath a blue color filter of the color-filter array;

the second red pixel being aligned beneath a red color filter of the color-filter array; and the second IR pixel being aligned beneath an IR color filter of the color-filter array wherein:

in the fifth weighted sum, the second red, the second green, the second blue, and the second IR image-pixel values are weighted by respective weights $w_{11}$, $w_{12}$, $w_{13}$, and $w_{14}$, which are derived from a transmission spectrum of the red color filter at a red wavelength, a green wavelength, a blue wavelength, and an IR wavelength, respectively;

in the sixth weighted sum, the second red, the second green, the second blue, and the second IR image-pixel values are weighted by respective weights $w_{21}$, $w_{22}$, ad $w_{23}$, and $w_{24}$, which are derived from a transmission spectrum of the green color filter at the red wavelength, the green wavelength, the blue wavelength, and the IR wavelength, respectively;

in the seventh weighted sum, the second red, the second green, the second blue, and the second IR image-pixel values are weighted by respective weights $w_{31}$, $w_{32}$, $w_{33}$, and $w_{34}$, which are derived from a transmission spectrum of the blue color filter at the red wavelength, the green wavelength, the blue wavelength, and the IR wavelength, respectively; and in the eighth weighted sum, the second red, the second green, the second blue, and the second IR image-pixel values are weighted by respective weights $w_{41}$, $w_{42}$, $w_{43}$, and $w_{44}$, which are derived from a transmission spectrum of the IR color filter at the red wavelength, the green wavelength, the blue wavelength, and the IR wavelength, respectively.

17. A method for demosaicing an image captured by an image sensor having a pixel array that includes a Bayer unit, the method comprising:

determining, for a red pixel of the Bayer unit and with circuitry communicatively coupled to the pixel array, a first red image-pixel value, a first green image-pixel value, and a first blue image-pixel value such that:

a first weighted sum of the first red, the first green, and the first blue image-pixel values equals a red sensor-pixel value output by the red pixel;

a second weighted sum of the first red, the first green, and the first blue image-pixel values equals a green sensor-pixel value output by a green pixel of the Bayer unit that is adjacent to the red pixel; and a third weighted sum of the first red, the first green, and the first blue image-pixel values equals a blue sensor-pixel value output by a blue pixel of the Bayer unit that is adjacent to at least one of the red pixel and the blue pixel; and outputting, by the circuitry, a demosaiced image having, at a location in the demosaiced image corresponding to a location of the red pixel in the pixel array, a first RGB triplet that includes the first red image-pixel value, the first green image-pixel value, and the first blue image-pixel value.

18. The method of claim 17, the image sensor including a color-filter array, the red pixel, the green pixel, and the blue pixel being aligned, respectively, beneath a red color filter, a green color filter, and a blue color filter, of the color-filter array;

wherein:

in the first weighted sum, the first red, the first green, and the first blue image-pixel values are weighted by respective weights $w_{11}$, $w_{12}$, and $w_{13}$, which are derived from a transmission spectrum of the red color filter at a red wavelength, a green wavelength, and a blue wavelength, respectively;

in the second weighted sum, the first red, the first green, and the first blue image-pixel values are weighted by respective weights $w_{21}$, $w_{22}$, and $w_{23}$, which are derived from a transmission spectrum of the green color filter at the red wavelength, the green wavelength, and the blue wavelength, respectively; and in the third weighted sum, the first red, the first green, and the first blue image-pixel values are weighted by respective weights $w_{31}$, $w_{32}$, and $w_{33}$, which are derived from a transmission spectrum of the blue color filter at the red wavelength, the green wavelength, and the blue wavelength, respectively.

* * * * *